(12) United States Patent
Zhao et al.

(10) Patent No.: US 12,413,776 B2
(45) Date of Patent: Sep. 9, 2025

(54) METHOD AND DEVICE FOR INTRA PREDICTION BASED ON PLURALITY OF DIMD MODES

(71) Applicant: LG Electronics Inc., Seoul (KR)

(72) Inventors: Jie Zhao, Seoul (KR); Seunghwan Kim, Seoul (KR); Seethal Paluri, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 18/286,417

(22) PCT Filed: Apr. 11, 2022

(86) PCT No.: PCT/KR2022/005196
§ 371 (c)(1),
(2) Date: Oct. 11, 2023

(87) PCT Pub. No.: WO2022/220514
PCT Pub. Date: Oct. 20, 2022

(65) Prior Publication Data
US 2024/0196008 A1 Jun. 13, 2024

Related U.S. Application Data

(60) Provisional application No. 63/173,493, filed on Apr. 11, 2021.

(51) Int. Cl.
*H04N 7/12* (2006.01)
*H04N 19/11* (2014.01)
(Continued)

(52) U.S. Cl.
CPC ........... *H04N 19/593* (2014.11); *H04N 19/11* (2014.11); *H04N 19/115* (2014.11);
(Continued)

(58) Field of Classification Search
CPC ..................................................... H04N 19/11
See application file for complete search history.

(56) References Cited

U.S. PATENT DOCUMENTS

| 2019/0166370 A1 | 5/2019 | Xiu et al. |
| 2019/0215521 A1 | 7/2019 | Chuang et al. |
| 2020/0296356 A1 | 9/2020 | Mora et al. |

FOREIGN PATENT DOCUMENTS

| WO | WO 2019/007490 | 1/2019 |

OTHER PUBLICATIONS

International Search Report and Written Opinion in Appln. No. PCT/KR2022/005196, mailed on Jul. 4, 2022, 8 pages (with English translation).
(Continued)

*Primary Examiner* — Young Lee
(74) *Attorney, Agent, or Firm* — Fish & Richardson P.C.

(57) ABSTRACT

According to one embodiment of the present specification, provided is an image decoding method performed by a decoding device. The method comprises the steps of: acquiring, from a bitstream, image information comprising information related to decoder-side intra mode derivation (DIMD); determining, on the basis of the information related to DIMD, whether DIMD is applied to a current block; deriving DIMD modes for the current block on the basis that DIMD is applied to the current block; and generating a prediction sample for the current block on the basis of the DIMD modes.

20 Claims, 18 Drawing Sheets

(51) Int. Cl.
  *H04N 19/115*  (2014.01)
  *H04N 19/132*  (2014.01)
  *H04N 19/136*  (2014.01)
  *H04N 19/176*  (2014.01)
  *H04N 19/184*  (2014.01)
  *H04N 19/593*  (2014.01)

(52) U.S. Cl.
  CPC ......... *H04N 19/132* (2014.11); *H04N 19/136* (2014.11); *H04N 19/176* (2014.11); *H04N 19/184* (2014.11)

(56) References Cited

OTHER PUBLICATIONS

InterDigital Communications Inc., "Decoder-side intra mode derivation," Joint Video Exploration Team (JVET) of ITU-T SG 16 WP 3 and ISO/IEC JTC 1/SC 29/WG 11, Document: JVET-C0061, 3rd Meeting: Geneva, CH, May 26-Jun. 1, 2016, 5 pages.

METHOD AND DEVICE FOR INTRA PREDICTION BASED ON PLURALITY OF DIMD MODES

CROSS-REFERENCE TO RELATED APPLICATIONS

This application is a National Stage application under 35 U.S.C. § 371 of International Application No. PCT/KR2022/005196, filed on Apr. 11, 2022, which claims the benefit of U.S. Provisional Application No. 63/173,493, filed on Apr. 11, 2021. The disclosures of the prior applications are incorporated by reference in their entirety.

TECHNICAL FIELD

The present disclosure relates to image coding technology, and more specifically, to a video decoding method and apparatus for deriving intra prediction mode in an image coding system.

BACKGROUND

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

The present disclosure provides a method and an apparatus for increasing image coding efficiency.

The present disclosure also provides a method and an apparatus for performing efficient intra prediction in image coding system.

According to an embodiment of the present disclosure, an image decoding method performed by a decoding apparatus is provided. The method includes obtaining image information including DIMD (Decoder side Intra Mode Derivation) related information from a bitstream, determining whether a DIMD is applied to a current block based on the DIMD related information, deriving intra prediction mode for the DIMD modes for the current block based on the DIMD being applied to the current block, and generating prediction sample of the current block based on the intra prediction mode.

According to another embodiment of the present disclosure, an image encoding method performed by an encoding apparatus is provided. The method includes determining whether a DIMD (Decoder side Intra Mode Derivation) mode is applied to a current bloc, generating DIMD related information related to whether the DIMD is applied to the current block, deriving DIMD modes for the current block based on the DIMD being applied to the current block, generating prediction sample of the current block based on the DIMD modes, and encoding image information including the DIMD related information.

According to still another embodiment of the present disclosure, a computer-readable storage medium is provided. The computer-readable storage medium stores a bitstream generated by a method, the method includes determining whether a DIMD (Decoder side Intra Mode Derivation) mode is applied to a current bloc, generating DIMD related information related to whether the DIMD is applied to the current block, deriving DIMD modes for the current block based on the DIMD being applied to the current block, generating prediction sample of the current block based on the DIMD modes, and encoding image information including the DIMD related information.

According to the present disclosure, image information including DIMD (Decoder side Intra Mode Derivation) related information is obtained from a bitstream, determine whether a DIMD is applied to a current block based on the DIMD related information, derive the DIMD modes for the current block based on the DIME being applied to the current block, and generate prediction samples of the current block based on the intra prediction mode. Through this, by deriving DIMD modes using already coded pixels instead of signaling the intra prediction mode through the bitstream, the overhead that occurs in the process of signaling the intra prediction mode can be reduced and the overall coding efficiency can be improved, prediction accuracy can be increased by deriving prediction samples through a weighted average based on prediction samples derived based on the DIMD modes.

DETAILED DESCRIPTION

Figure 1:
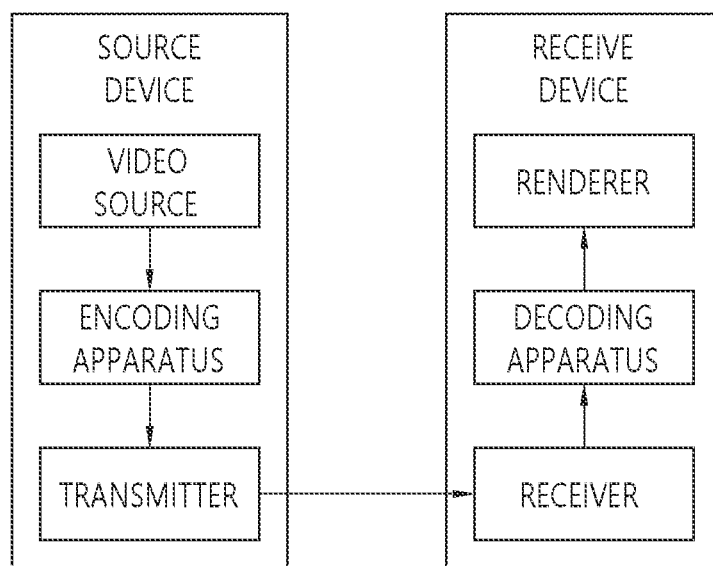
FIG. 1 schematically illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Present disclosure relates to video/image coding. For example, the methods/embodiments disclosed in the present disclosure may be related to the versatile video coding (VVC) standard (ITU-T Rec H.266), the next-generation video/image coding standard after VVC, or other video coding related standards (for example, the High Efficiency Video Coding (HEVC) standard (ITU-T Rec. H.265), essential video coding (EVC) standard, AVS2 standard, etc.).

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

FIG. 1 schematically illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
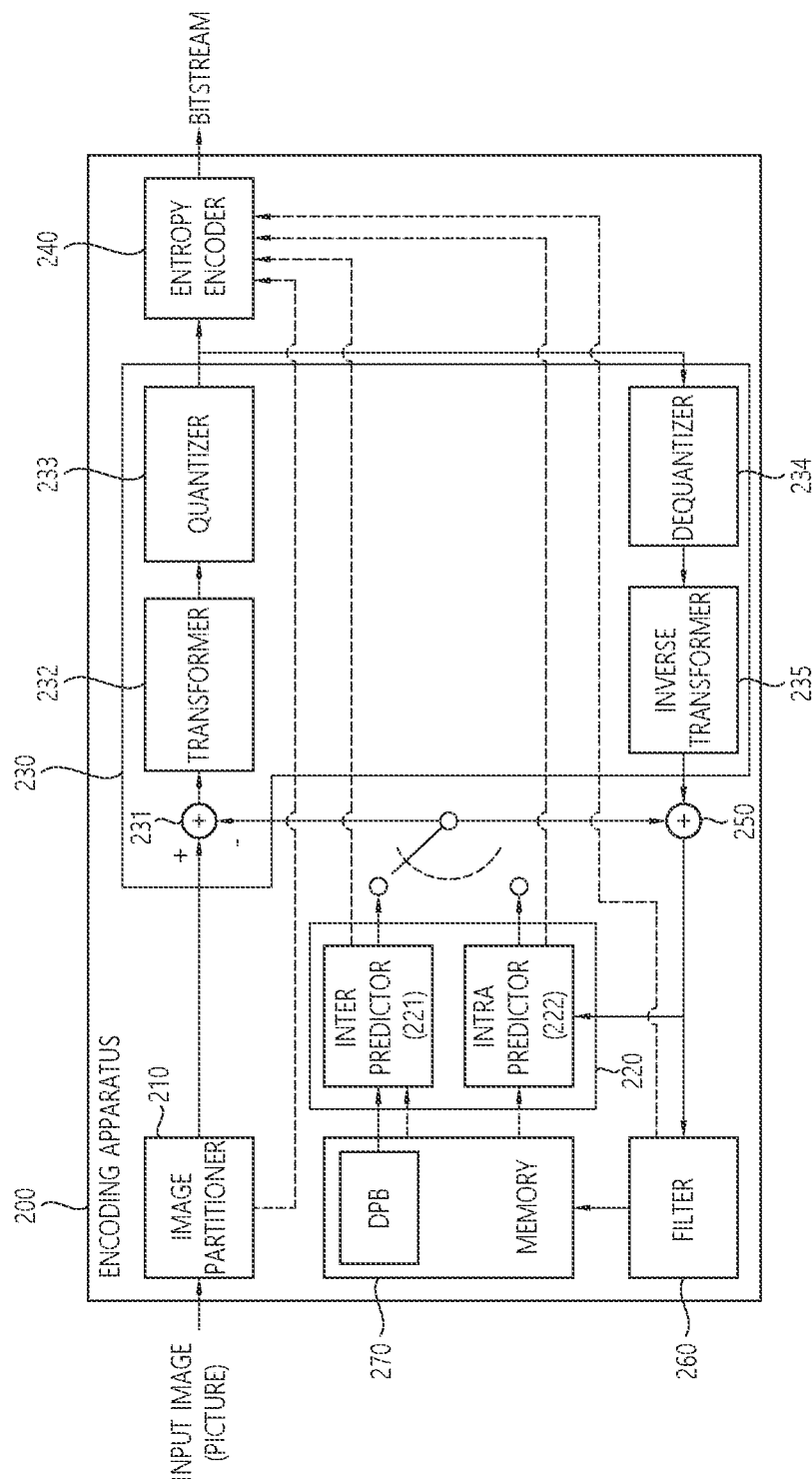
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding processaccording to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a process of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the subtractor 231, a prediction signal (predicted block, prediction samples or prediction sample array) output from the predictor 220 is subtracted from an input image signal (original block, original samples or original sample array) to generate a residual signal (residual block, residual samples or residual sample array), and the generated residual signal is transmitted to the transformer 232. The predictor 220 may perform prediction on a block to be processed (hereinafter, referred to as a current block) and generate a predicted block including prediction samples for the current block. The predictor 220 may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction. the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) prediction mode. The IBC, for example, may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The prediction signal generated by the inter predictor 221 and/or the intra predictor 222 may be used to generate a reconstructed signal or to generate a residual signal. The transformer 232 may generate transform coefficients by applying a transform technique to the residual signal. For example, the transform technique may include a discrete cosine transform (DCT), a discrete sine transform (DST), a graph-based transform (GBT), or a conditionally non-linear transform (CNT), etc. Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NAL (network abstraction layer) unit in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements to be described later may be encoded through the above-described encoding process and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed sample array). If there is no residual for the block to be processed, such as a case where the skip mode is applied, the predicted block may be used as the reconstructed block. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filter, a bilateral filter, and the like. The filter 260 may generate various information related to the filtering and transmit the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as the reference picture in the inter predictor 260. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
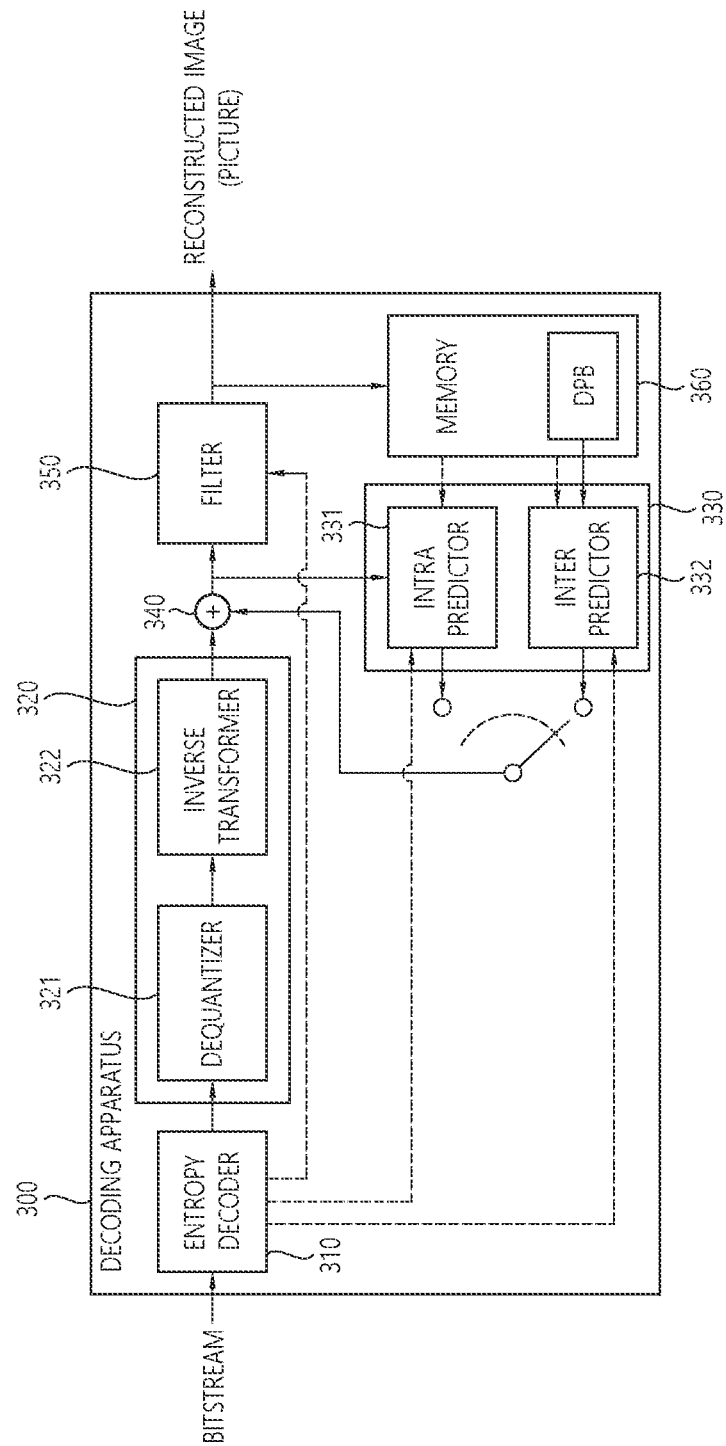
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 333 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding process and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The IBC may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure The intra predictor 332 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 332 may determine the prediction mode applied to the current block by using a prediction mode applied to a neighboring block.

The inter predictor 331 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 331 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture that have already been reconstructed. The stored motion information may be transmitted to the inter predictor 331 so as to be utilized as the motion information of the spatial neighboring block or the motion information of the temporal neighboring block. The memory 360 may store reconstructed samples of reconstructed blocks in the current picture and transfer the reconstructed samples to the intra predictor 332.

In this specification, the embodiments described in the predictor 330, the dequantizer 321, the inverse transformer 322, and the filter 350 of the decoding apparatus 300 may be applied to the same or correspond to to the predictor 220, the dequantizer 234, the inverse transformer 235, and the filter 260 of the encoding apparatus 200 respectively.

As described above, in performing video coding, prediction is performed to increase compression efficiency. Through this, it is possible to generate a predicted block including prediction samples for the current block, which is a block to be coded. Here, the predicted block includes prediction samples in the spatial domain (or pixel domain) The predicted block is derived in the same way from an encoding apparatus and a decoding apparatus, and the encoding apparatus can increase image coding efficiency by signaling information (residual information) between the original block and the predicted block to the decoding apparatus, not the original sample value of the original block itself. The decoding apparatus can derive a residual block containing residual samples based on the above residual information, combine the above residential block with the above predicted block to create a restore block containing restoration samples, and create a restore picture containing restoration blocks.

The residual information may be generated through a transform and quantization process. For example, the encoding apparatus may derive a residual block between the original block and the predicted block, derive transform coefficients by performing the transform process on the residual samples (residual sample array) included in the residual block, derive quantized transform coefficients by performing the quantization process on the transform coefficients, and signaling related residual information (through a bitstream) to the decoding apparatus. Here, the residual information may include information such as value information, position information, transform technique, transform kernel, quantization parameter of the quantized transform coefficients, etc. The decoding apparatus may perform a dequantization/inverse transform process based on the residual information and derive residual samples (or residual blocks). The decoding apparatus may generate a reconstructed picture based on the predicted block and the residual block. The encoding apparatus may also derive a residual block by dequantizing/inverse transforming quantized transform coefficients for reference to the inter-prediction of the picture, and generate a reconstructed picture based on this.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients Residual samples may be derived based on the inverse transforming (transforming) on the scaled transform coefficients. This may be applied/expressed in other parts of the present disclosure as well.

In this document, quantized transform coefficients and transform coefficients may be referred to as transform coefficients and scaled transform coefficients, respectively. In this case, the residual information may include information on transform coefficient(s), and the information on the transform coefficient(s) may be signaled through residual coding syntax. Transform coefficients may be derived based on the residual information (or information about the transform coefficient(s)), and scaled transform coefficients may be derived through inverse transform (scaling) of the transform coefficients. Residual samples may be derived based on an inverse transform (transform) to the scaled transform coefficients. This may be applied/expressed in other parts of this document as well.

A predictor of the encoding apparatus/decoding apparatus may derive prediction samples by performing inter prediction on a block-by-block basis. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector in a reference picture indicated by a reference picture index. In this case, in order to reduce the amount of motion information transmitted in the inter-prediction mode, motion information of the current block may be predicted in units of blocks, subblocks, or samples based on correlation of motion information between neighboring blocks and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block present in the current picture and a temporal neighboring block present in the reference picture. A reference picture including the reference block and a reference picture including the temporal neighboring block may be the same or different. The temporal neighboring block may be called a collocated reference block, a collocated CU (colCU), and the like, and a reference picture including the temporal neighboring block may be called a collocated picture (colPic). For example, a motion information candidate list may be constructed based on neighboring blocks of the current block, and a flag or index information indicating which candidate is selected (used) to derive the motion vector and/or reference picture index of the current block may be signaled. Inter prediction may be performed based on various prediction modes. For example, in the case of skip mode and merge mode, motion information of a current block may be the same as motion information of a selected neighboring block. In the case of the skip mode, the residual signal may not be transmitted unlike the merge mode. In the case of a motion vector prediction (MVP) mode, a motion vector of a selected neighboring block is used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called Bi prediction. Here, the L0 motion vector may indicate a motion vector related to the reference picture list L0 (L0), and the L1 motion vector may indicate a motion vector related to the reference picture list L1 (L1). The reference picture list L0 may include pictures prior to the current picture in output order as reference pictures, and the reference picture list L1 may include pictures subsequent to the current picture in output order. The previous pictures may be referred to as forward (reference) pictures, and the subsequent pictures may be referred to as backward (reference) pictures. The reference picture list L0 may further include subsequent pictures in an output order as reference pictures than the current picture. In this case, the previous pictures in the reference picture list L0 may be indexed first, and the later pictures may be indexed next. The reference picture list L1 may further include, as reference pictures, pictures previous to the current picture in output order. In this case, the subsequent pictures in the reference picture list 1 may be indexed first, and the previous pictures may be indexed next. Here, the output order may correspond to a picture order count (POC) order.

Figure 4:
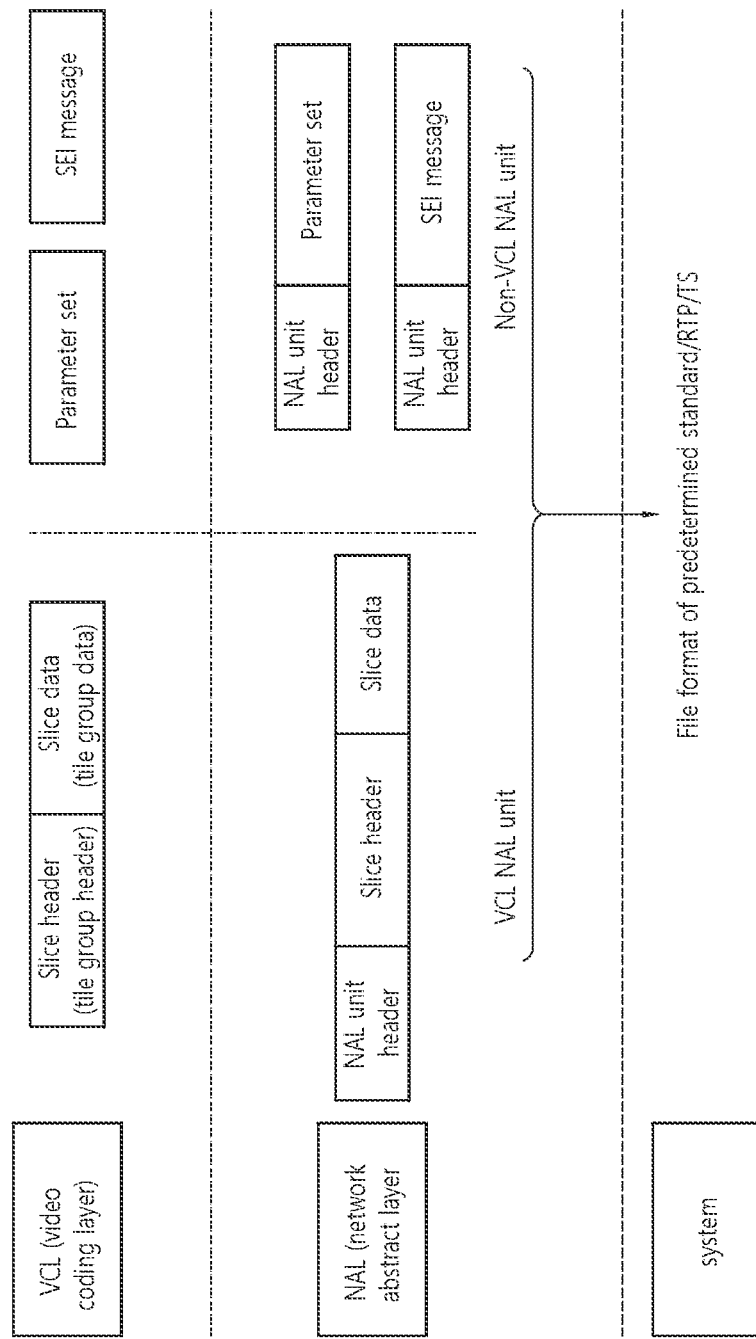
FIG. 4 schematically shows a hierarchical structure for coded video/image.

FIG. 4 exemplarily illustrates a layer structure for a coded video/image.

Referring to FIG. 4, a coded video/image is divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

VCL data including compressed image data (slice data), or a parameter set including a picture parameter set (PPS), a sequence parameter set (SPS), or a video parameter set (VPS), or a supplemental enhancement information (SEI) message additionally required in an image decoding process may be generated, in the VCL.

In the NAL, header information (NAL unit data) is added to a raw byte sequence payload (RSRP) generated in the VCL to generate the NAL unit. In here, the RBSP refers to the slice data, the parameter set, the SEI message, etc., generated in the VCL. The NAL unit header may include NAL unit type information specified according to RSRP data included in the corresponding NAL unit.

As illustrated in the figure above, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Decoding Capability Information (DCI) NAL unit: Type for the NAL unit including the DCI Picture header (PH) NAL unit: Type for the NAL unit including the PH The above-described NAL unit types have syntax information for the NAL unit type, and the syntax information may be stored in a NAL unit header and signaled. For example, the syntax information may be nal_unit_type, and NAL unit types may be specified with a nal_unit_type value.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. In this document, slices may be mixed or replaced with tile groups. Also, in this document, the slice header may be mixed or replaced with type group headers.

The slice header (slice header syntax, slice header information) may include information/parameters commonly applicable to the slice. The APS (APS Syntax) or PPS (PPS Syntax) may include information/parameters commonly applicable to one or more slices or pictures. The SPS (SPS Syntax) may include information/parameters commonly applicable to one or more sequences. The VPS (VPS syntax) may include information/parameters commonly applicable to multiple layers. The DCI (DCI syntax) may include information/parameters commonly applicable to overall video. The DCI may include information/parameters related to decoding capability. In this document, high level syntax (HLS) may include at least one of the APS syntax, PPS syntax, SPS syntax, VPS syntax, DCI syntax, picture header syntax, or slice header syntax.

In this document, image/video information encoded from an encoding apparatus to a decoding apparatus and signaled in the form of a bitstream includes not only intra-picture partitioning related information, intra/inter prediction information, residual information, in-loop filtering information, and the like, but also information included in the slice header, information included in the picture header, information included in the APS, information included in the PPS, information included in an SPS, information included in a VPS, and/or information included in a DCI. Also, the image/video information may further include NAL unit header information.

Meanwhile, when intra prediction is performed, correlation between samples may be used and a difference between an original block and a prediction block, that is, a residual may be obtained. The above-described transform and quantization may be applied to the residual, through this, spatial redundancy may be removed. Hereinafter, an encoding method and a decoding method using intra prediction will be described in detail.

Intra prediction refers to prediction that generates prediction samples for a current block based on reference samples outside the current block in a picture including the current block (hereinafter referred to as the current picture). Here, reference samples outside the current block may refer to samples positioned around the current block. When intra prediction is applied to the current block, neighboring reference samples to be used for intra prediction of the current block may be derived.

For example, when the size (width×height) of the current block is nW×nH, the neighboring reference samples of the current block may include a total of 2×nH samples including samples adjacent to the left boundary of the current block and samples neighboring to the bottom-left of the current block, a total of 2×nW samples including samples adjacent to the top boundary and samples neighboring to the top-right current block, and 1 sample adjacent to the top-left of the current block. Alternatively, the neighboring reference samples of the current block may include samples top neighboring samples in a plurality of columns and left neighboring samples in a plurality of rows. In addition, the neighboring reference samples of the current block may include a total of nH samples adjacent to the right boundary of the current block of size nW×nH, a total of nW samples adjacent to the bottom boundary of the current block of size nW×nH, and 1 sample neighboring to the bottom-right of the current block of size nW×nH.

However, some of the neighboring reference samples of the current block may not be decoded yet or may not be available. In this case, the decoding apparatus may configure neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of the neighboring reference samples of the current block, and (ii) a prediction sample may be derived based on a reference sample existing in a specific (prediction) direction with respect to the prediction sample among neighboring reference samples of the current block. Case (i) may be applied when the intra prediction mode is a non-directional mode or non-angular mode, and case (ii) may be applied when the intra prediction mode is a directional mode or an angular mode.

In addition, through interpolation between a first neighboring sample located in a prediction direction of the intra prediction mode of the current block based on the prediction sample of the current block among the neighboring reference samples and a second neighboring sample located in the opposite direction of the prediction direction, the prediction sample may be generated. The above case may be called linear interpolation intra prediction (LIP). Also, chroma prediction samples may be generated based on luma samples using a linear model. This case can be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

A reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, or ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Meanwhile, in addition to the above-described intra prediction types, matrix based intra prediction (MIP) may be used as one method for intra prediction. MIP may be referred to as affine linear weighted intra prediction (ALWIP) or matrix weighted intra prediction (MIP).

If the MIP is applied to the current block, i) using neighboring reference samples on which an averaging process has been performed, ii) matrix-vector-multiplication process is performed, and iii) a horizontal/vertical interpolation process may be further performed to derive prediction samples for the current block as necessary. The intra prediction modes used for the MIP may be configured to be different from the intra prediction modes used in the LIP, PDPC, MRL, ISP intra prediction or normal intra prediction.

The intra prediction mode for MIP may be called "affine linear weighted intra prediction mode" or matrix-based intra prediction mode. For example, a matrix and an offset used in matrix vector multiplication may be set differently according to the intra prediction mode for the MIP. Here, the matrix may be referred to as an (affine) weight matrix, and the offset may be referred to as an (affine) offset vector or an (affine) bias vector. In this document, intra prediction mode for MIP may be called MIP intra prediction mode, linear weighted intra prediction mode, matrix weighted intra prediction mode, or matrix based intra prediction mode. A specific MIP method will be described later.

The following drawings are prepared to explain specific examples of this document. Since the names of specific devices or specific terms or names (eg, names of syntaxes) described in the drawings are provided as examples, the technical features of this document are not limited to the specific names used in the drawings below.

Figure 5:
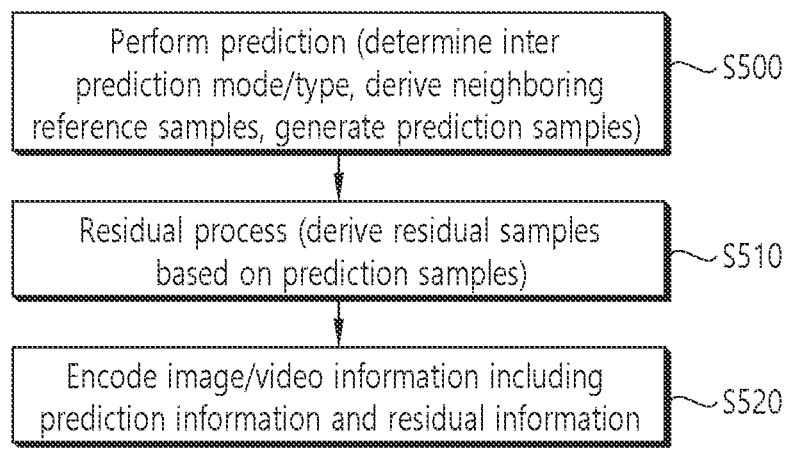
FIG. 5 schematically illustrates an example of an image encoding method based on intra prediction to which embodiments of the present disclosure may be applied.
Figure 6:
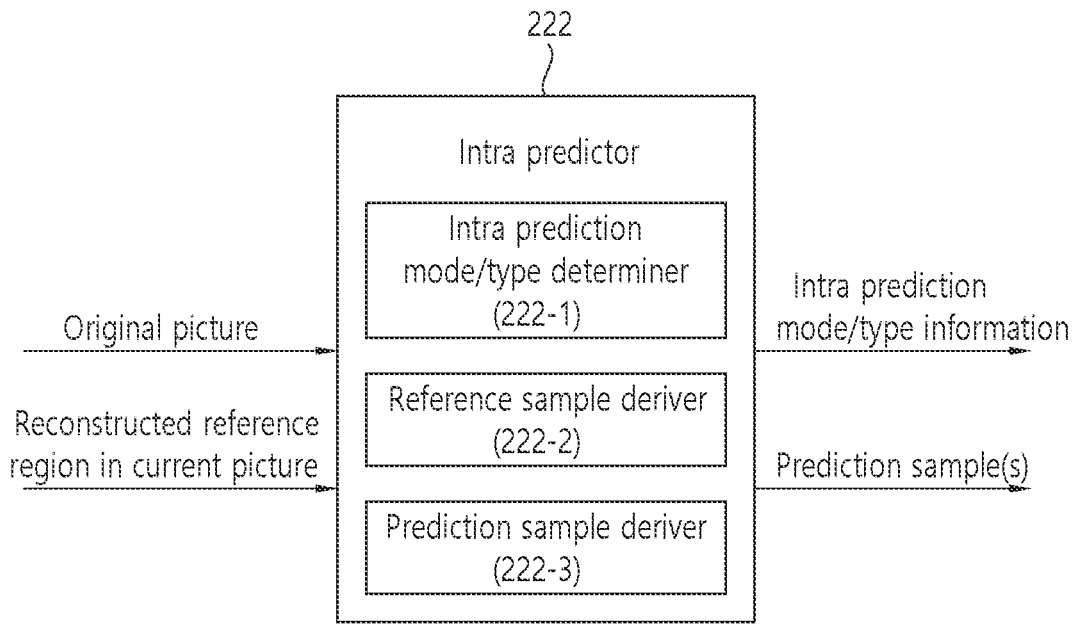
FIG. 6 schematically illustrates an intra predictor in an encoding apparatus.

FIG. 5 schematically illustrates an example of an image encoding method based on intra prediction to which embodiments of the present disclosure may be applied, and FIG. 6 schematically illustrates an intra predictor in an encoding apparatus. The intra predictor in the encoding apparatus of FIG. 6 may be applied to the same or corresponding to the intra predictor 222 of the encoding apparatus 200 of FIG. 2 described above.

Referring to FIGS. 5 and 6, S500 may be performed by the intra predictor 222 of the encoding apparatus, and S510 may be performed by the residual processor 230 of the encoding apparatus. Specifically, S510 may be performed by the subtractor 231 of the encoding apparatus. In S520, prediction information may be derived by the intra predictor 222 and encoded by the entropy encoder 240. In S520, residual information may be derived by the residual processor 230 and encoded by the entropy encoder 240. The residual information is information about residual samples. The residual information may include information about quantized transform coefficients of residual samples. As described above, the residual samples may be derived as transform coefficients through a transformer of the encoding apparatus, and the transform coefficients may be derived as quantized transform coefficients through a quantizer. Information about quantized transform coefficients may be encoded in the entropy encoder 240 through a residual coding process.

The encoding apparatus performs intra prediction on the current block (S500). The encoding apparatus may derive an intra prediction mode/type for the current block, derive neighboring reference samples of the current block, and generate prediction samples within the current block based on the intra prediction mode/type and the neighboring reference samples. Here, intra prediction mode/type determination, neighboring reference samples derivation, and prediction samples generation process may be performed simultaneously, or one process may be performed prior to another process.

For example, the intra predictor 222 of the encoding apparatus may include an intra prediction mode/type determiner 222-1, a reference sample deriver 222-2, and a prediction sample deriver 222-3. The intra prediction mode/type determiner 222-1 determines the intra prediction mode/type for the current block, the reference sample deriver 222-2 derives neighboring reference samples of the current block, and the prediction sample deriver 222-3 may derive prediction samples of the current block. Meanwhile, although not shown, when a prediction sample filtering process is performed, the intra predicter 222 may further include a prediction sample filter (not shown). The encoding apparatus may determine a mode/type applied to the current block from among a plurality of intra prediction modes/types. The encoding apparatus may compare RD costs for intra prediction modes/types and determine an optimal intra prediction mode/type for the current block.

As described above, the encoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The encoding apparatus generates residual samples for the current block based on the (filtered) prediction samples (S1920). The encoding apparatus may compare prediction samples from original samples of the current block based on phase and derive residual samples.

The encoding apparatus may encode image information including intra prediction information (prediction information) and residual information about residual samples (S520). Prediction information may include intra prediction mode information and intra prediction type information. Residual information may include residual coding syntax. The encoding apparatus may transform/quantize the residual samples to derive quantized transform coefficients. The residual information may include information about the quantized transform coefficients.

The encoding apparatus may output encoded image information in the form of a bitstream. The output bitstream may be delivered to a decoding apparatus through a storage medium or network.

As described above, the encoding apparatus may generate a reconstructed picture (including reconstructed samples and a reconstructed block). To this end, the encoding apparatus may derive (modified) residual samples by dequantizing/inverse transforming the quantized transform coefficients again. The reason for performing dequantization/inverse transformation after transforming/quantizing the residual samples in this way is to derive the same residual samples as the residual samples derived from the decoding apparatus as described above. The encoding apparatus may generate a reconstructed block including reconstructed samples for the current block based on prediction samples and (modified) residual samples. A reconstructed picture for a current picture may be generated based on the reconstructed block. As described above, an in-loop filtering process or the like may be further applied to the reconstructed picture.

Figure 7:
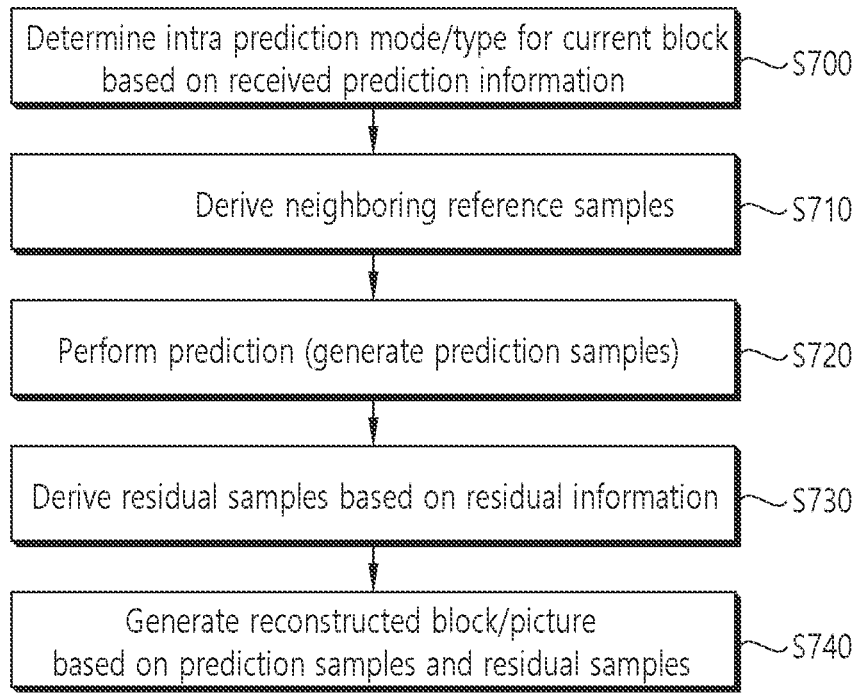
FIG. 7 schematically illustrates an example of an image decoding method based on intra prediction to which embodiments of the present disclosure may be applied.
Figure 8:
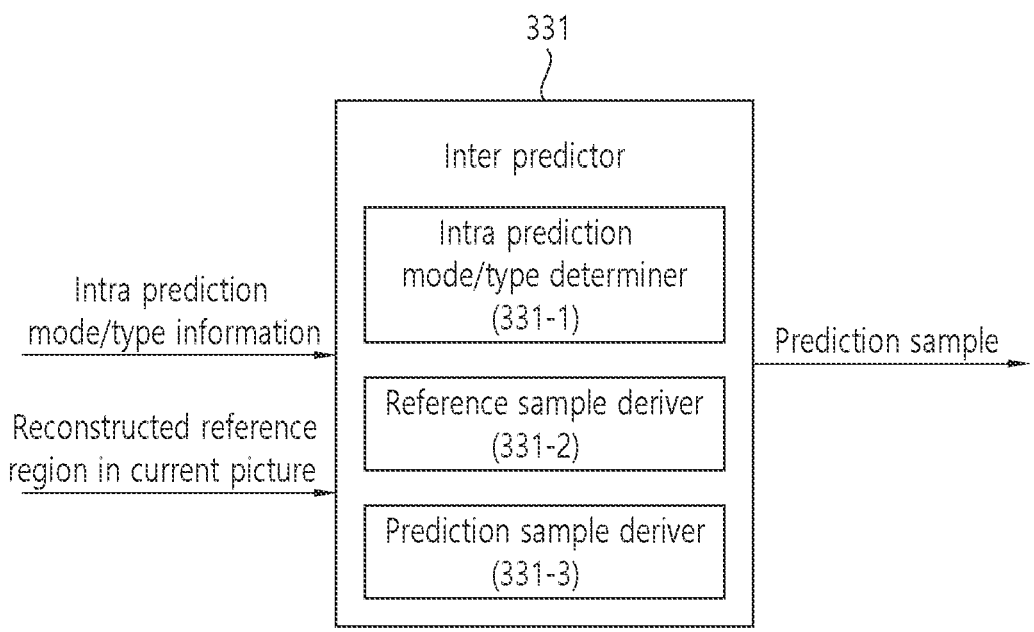
FIG. 8 schematically illustrates an intra predictor in a decoding apparatus.

FIG. 7 schematically illustrates an example of an image decoding method based on intra prediction to which embodiments of the present disclosure may be applied, and FIG. 8 schematically illustrates an intra predictor in a decoding apparatus. The intra predictor in the decoding apparatus of FIG. 8 may be applied to the same or corresponding to the above-described intra predictor 331 of the decoding apparatus 300 of FIG. 2.

Referring to FIGS. 7 and 8, the decoding apparatus may perform an operation corresponding to the operation performed by the above-described encoding apparatus. S700 to S720 may be performed by the intra predictor 331 of the decoding apparatus, and the prediction information of S700 and the residual information of S730 may be obtained from the bitstream by the entropy decoder 310 of the decoding apparatus. The residual processor 320 of the decoding apparatus may derive residual samples for the current block based on the residual information. Specifically, the dequantizer 321 of the residual processor 320 derives transform coefficients by performing dequantization based on the quantized transform coefficients derived based on the residual information, and the inverse transformer of residual processor 322 may derive residual samples for the current block by performing an inverse transform on the transform coefficients. S740 may be performed by the adder 340 or a reconstructor of the decoding apparatus.

The decoding apparatus may derive an intra prediction mode/type for the current block based on the received prediction information (intra prediction mode/type information) (S700). The decoding apparatus may derive neighboring reference samples of the current block (S710). The decoding apparatus generates prediction samples within the current block based on the intra prediction mode/type and neighboring reference samples (S720). In this case, the decoding apparatus may perform a prediction sample filtering process Prediction sample filtering may be referred to as post filtering. Some or all of the prediction samples may be filtered through the prediction sample filtering process. In some cases, the prediction sample filtering process may be omitted.

The decoding apparatus generates residual samples for the current block based on the received residual information (S730). The decoding apparatus may generate reconstructed samples for the current block based on the prediction samples and residual samples, and derive a reconstructed block including the reconstructed samples (S740). A reconstructed picture for a current picture may be generated based on the reconstructed block. As described above, an in-loop filtering process or the like may be further applied to the reconstructed picture.

Here, the intra predictor 331 of the decoding apparatus may include an intra prediction mode/type determiner 231-1, a reference sample deriver 331-2, and a prediction sample deriver 231-3. The intra prediction mode/type determiner 331-1 determines the intra prediction mode/type of the current block based on the intra prediction mode/type information obtained from the entropy decoder 310, and the reference sample deriver 331-2) may derive neighboring reference samples of the current block, and the prediction sample deriver 331-3 may derive prediction samples of the current block. Meanwhile, although not shown, when the above-described prediction sample filtering process is performed, the intra prediction unit 331 may further include a prediction sample filter (not shown).

The intra prediction mode information may include, for example, flag information (ex. intra_luma_mpm_flag) indicating whether the most probable mode (MPM) or remaining mode is applied to the current block. In this case, when MPM is applied to the current block, the prediction mode information may further include index information (ex. intra_luma_mpm_idx) indicating one of intra prediction mode candidates (MPM candidates). Intra prediction mode candidates (MPM candidates) may be composed of an MPM candidate list or an MPM list. In addition, when MPM is not applied to the current block, the intra prediction mode information may further include remaining mode information (ex. intra_luma_mpm_remainder) indicating one of intra prediction modes other than intra prediction mode candidates (MPM candidates). there is. The decoding apparatus may determine the intra prediction mode of the current block based on the intra prediction mode information.

In addition, intra prediction type information may be implemented in various forms. For example, intra prediction type information may include intra prediction type index information indicating one of intra prediction types. As another example, the intra prediction type information includes at least one of reference sample line information (ex. intra_luma_ref_idx) indicating whether the MRL is applied to the current block and, if the MRL is applicable, whether a reference sample line is used or not, ISP flag information (ex. intra_subpartitions_mode_flag) indicating whether the ISP is applied to the current block, ISP type information (ex. intra_subpartitions_split_flag) in which subpartitions indicates a partition type when the ISP is applied, flag information indicating whether PDCP is applied, or flag information whether LIP is applied. In addition, the intra prediction type information may include a MIP flag information indicating whether MIP is applied to the current block.

The aforementioned intra prediction mode information and/or intra prediction type information may be encoded/decoded through the coding method described in this document. For example, the aforementioned intra prediction mode information and/or intra prediction type information may be encoded/decoded through entropy coding (eg. CABAC, CAVLC) coding based on truncated (rice) binary code.

Figure 9:
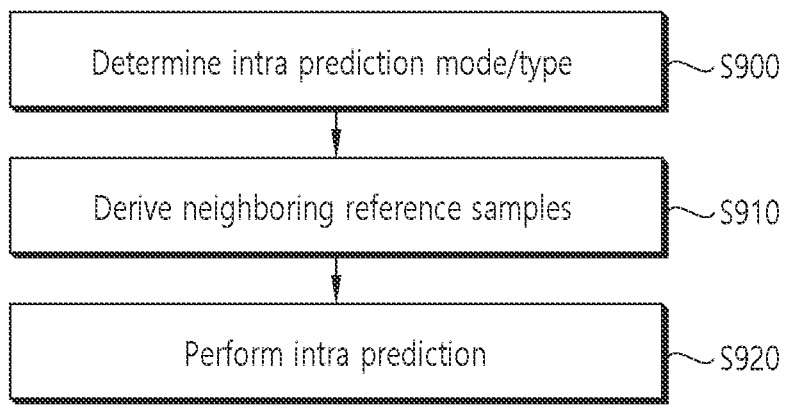
FIG. 9 exemplarily illustrates a schematic intra prediction process to which embodiments of the present disclosure may be applied.

FIG. 9 exemplarily illustrates a schematic intra prediction process to which embodiments of the present disclosure may be applied.

Referring to FIG. 9, as described above, the intra prediction process may include determining an intra prediction mode/type, deriving neighboring reference samples, and performing intra prediction (generating prediction samples). The intra prediction process may be performed in the encoding apparatus and the decoding apparatus as described above. A coding apparatus in this document may include an encoding apparatus and/or a decoding apparatus.

The coding apparatus may determine an intra prediction mode/type (S900).

The encoding apparatus may determine an intra prediction mode/type applied to the current block among various intra prediction modes/types described above and generate prediction-related information. The prediction related information may include intra prediction mode information indicating an intra prediction mode applied to the current block and/or intra prediction type information indicating an intra prediction type applied to the current block. The decoding apparatus may determine an intra prediction mode/type applied to the current block based on the prediction related information.

As described above, the intra prediction mode information may include at least one of MPM flag information, non-planar flag information, MPM index information, and/or remaining mode (MPM reminder) information. As described above, the intra prediction type information includes reference sample line (MRL index) information (ex intra_luma_ref_idx), ISP flag information (ex. intra_subpartitions_mode_flag), ISP type information (ex. intra_subpartitions_split_flag), and flag information indicating whether PDCP is applied or not, flag information indicating whether LIP is applied and/or MIP flag information.

For example, when intra prediction is applied, the intra prediction mode applied to the current block may be determined using the intra prediction modes of neighboring blocks. For example, the coding apparatus may select one of MPM candidates in a most probable mode (MPM) list derived based on an intra prediction mode and/or additional candidate modes of a neighboring block (eg, a left and/or upper neighboring block) of a current block, based on the received MPM index, or may select one of the remaining intra prediction modes not included in the MPM candidates (and planar mode) based on MPM reminder information (remaining intra prediction mode information). The MPM list may be configured to include or not include a planar mode as a candidate. For example, if the mpm list includes the planar mode as a candidate, the MPM list may have 6 candidates, and if the MPM list does not include the planar mode as a candidate, the mpm list may have 5 candidates. When the MPM list does not include a planar mode as a candidate, a non-planar flag (ex. intra_luma_not planar_flag) indicating whether the intra prediction mode of the current block is not a planar mode may be signaled. For example, the MPM flag may be signaled first, and the MPM index and non-planar flag may be signaled when the value of the MPM flag is 1. Also, the MPM index may be signaled when the value of the non-planar flag is 1. Here, the reason why the MPM list is configured not to include the planar mode as a candidate is that the planar mode is not MPM, rather than that the planar mode is always considered as the MPM, so a not planar flag is first signaled. This is to check whether it is in planar mode first.

For example, whether the intra prediction mode applied to the current block is among MPM candidates (and planar mode) or remaining mode may be indicated based on an MPM flag (ex. intra_luma_mpm_flag). A value of 1 of the MPM flag may indicate that the intra prediction mode for the current block is within MPM candidates (and planar mode), and a value of 0 of the MPM flag may indicate that the intra prediction mode for the current block is not within MPM candidates (and planar mode). The not planar flag (ex. intra_luma_not_planar_flag) value 0 may indicate that the intra prediction mode of the current block is the planar mode, and the not planar flag value 1 may indicate that the intra prediction mode of the current block is not the planar mode. The MPM index may be signaled in the form of an mpm_idx or intra_luma_mpm_idx element, and the remaining intra prediction mode information may be signaled in the form of a rem_intra_luma_pred_mode or intra_luma_mpm_remainder syntax element. For example, the remaining intra prediction mode information may indicate one of all intra prediction modes by indexing remaining intra prediction modes not included in the MPM candidates (and planar mode) in order of prediction mode numbers. The intra prediction mode may be an intra prediction mode for a luma component (sample). Hereinafter, the intra prediction mode information includes at least one of the MPM flag (ex. intra_luma_mpm_flag), the not planar flag (ex. intra_luma_not_planar_flag), the MPM index (ex. mpm_idx or intra_luma_mpm_idx), and the remaining intra prediction mode information (rem_intra_luma_pred_mode or intra_luma_mpm_remainder). In this document, the MPM list may be called various terms such as MPM candidate list and candModeList.

When MIP is applied to the current block, a separate mpm flag (ex. intra_mip_mpm_flag), mpm index (ex. intra_mip_mpm_idx), and remaining intra prediction mode information (ex. intra_mip_mpm_remainder) for MIP may be signaled, and the not planar flag may not be signaled.

In other words, when an image is generally partitioned into blocks, the current block to be coded and neighboring blocks have similar image characteristics. Therefore, the current block and neighboring blocks are highly likely to have the same or similar intra prediction modes. Thus, the encoder can use the intra-prediction mode of the neighboring block to encode the intra-prediction mode of the current block.

A most probable modes (MPM) list for a current block of a coding apparatus may be configured. The MPM list may also be referred to as an MPM candidate list. Here, the MPM may mean a mode used to improve coding efficiency by considering the similarity between the current block and neighboring blocks during intra prediction mode coding. As described above, the MPM list may include the planar mode or may exclude the planar mode. For example, when the MPM list includes a planar mode, the number of candidates in the MPM list may be 6. And, when the MPM list does not include the planar mode, the number of candidates in the MPM list may be five.

The encoding apparatus may perform prediction based on various intra prediction modes, and may determine an optimal intra prediction mode based on rate-distortion optimization (RDO) based thereon. In this case, the encoding apparatus may determine the optimal intra prediction mode using only the MPM candidates and planar mode configured in the MPM list, or may further use the remaining intra-prediction modes as well as MPM candidates and planar modes configured in the MPM list. Specifically, if the intra prediction type of the current block is a specific type (eg, LIP, MRL, or ISP) rather than a normal intra prediction type, the encoding apparatus considers only the MPM candidates and planar mode as the intra prediction mode candidates for the current block, and then determines the optimal intra prediction mode. That is, in this case, the intra prediction mode for the current block may be determined only from among the MPM candidates and the planar mode, and in this case, the mpm flag may not be encoded/signaled. In this case, the decoding apparatus may estimate that the mpm flag is 1 without separately signaling the mpm flag.

Meanwhile, in general, when the intra prediction mode of the current block is not a planar mode and is one of MPM candidates in the MPM list, the encoding apparatus generates an mpm index (mpm idx) indicating one of the MPM candidates. If the intra prediction mode of the current block is not included in the MPM list, MPM remainder information (remaining intra prediction mode information) indicating the same mode as the intra prediction mode of the current block among the remaining intra prediction modes not included in the MPM list (and planar mode) is generating. The MPM reminder information may include, for example, an intra_luma_mpm_remainder syntax element.

The decoding apparatus obtains intra prediction mode information from the bitstream. As described above, the intra prediction mode information may include at least one of an MPM flag, a non-planar flag, an MPM index, or MPM reminder information (remaining intra prediction mode information). The decoding apparatus may construct an MPM list. The MPM list is configured identically to the MPM list configured in the encoding apparatus. That is, the MPM list may include intra prediction modes of neighboring blocks or may further include specific intra prediction modes according to a predetermined method.

The decoding apparatus may determine the intra prediction mode of the current block based on the MPM list and the intra prediction mode information. For example, when the value of the MPM flag is 1, the decoding apparatus derives a planar mode as an intra prediction mode of the current block (based on a not planar flag) or selects a candidate indicated by the MPM index from among MPM candidates in the MPM list. It can be derived as an intra prediction mode of the current block. Here, the MPM candidates may indicate only candidates included in the MPM list, or may include not only candidates included in the MPM list but also a planar mode that may be applied when the value of the MPM flag is 1.

As another example, when the value of the MPM flag is 0, the decoding apparatus may derive an intra prediction mode indicated by the remaining intra prediction mode information (which may be called mpm remainder information) among the remaining intra prediction modes not included in the MPM list and the planar mode as an intra prediction mode of the current block. Meanwhile, as another example, when the intra prediction type of the current block is a specific type (eg. LIP, MRL, or ISP), the decoding apparatus may derive the candidate indicated by the MPM flag in the planar mode or the MPM list as the intra prediction mode of the current block without parsing/decoding/confirming the MPM flag.

The coding device derives neighboring reference samples of the current block (S910). When intra prediction is applied to the current block, neighboring reference samples to be used for intra prediction of the current block may be derived. The neighboring reference samples of the current block include a total of 2×nH samples adjacent to the left boundary of the current block of size nW×nH and samples neighboring to the bottom-left of the current block of size nW×nH, and a total 2×nW samples adjacent to the top boundary of the current block and samples neighboring to the top-right of the current block of size nW×nH and 1 sample neighboring to the top-left of the current block. Alternatively, the neighboring reference samples of the current block may include samples top neighboring samples in a plurality of columns and left neighboring samples in a plurality of rows. In addition, the neighboring reference samples of the current block may include a total of nH samples adjacent to the right boundary of the current block of size nW×nH, a total of nW samples adjacent to the bottom boundary of the current block of size nW×nH, and 1 sample neighboring to the bottom-right of the current block of size nW×nH.

Meanwhile, when MRL is applied (ie, when the value of the MRL index is greater than 0), the neighboring reference samples may be located on lines 1 to 2 instead of line 0 adjacent to the current block on the left/upper side. In this case, the number of neighboring reference samples may be further increased. Meanwhile, when ISP is applied, the neighboring reference samples may be derived in units of sub-partitions.

The coding apparatus derives prediction samples by performing intra prediction on the current block (S920). The coding apparatus may derive the prediction samples based on the intra prediction mode/type and the neighboring samples. The coding apparatus may derive a reference sample according to an intra prediction mode of the current block among neighboring reference samples of the current block, and may derive a prediction sample of the current block based on the reference sample.

Meanwhile, when intra prediction is applied, an intra prediction mode applied to the current block may be determined using intra prediction modes of neighboring blocks. For example, the decoding apparatus may select one of mpm candidates in a most probable mode (mpm) list list derived based on an intra prediction mode of a neighboring block (eg, a left and/or an upper neighboring block) of a current block and additional candidate modes, based on received mpm index, or may select one of the remaining intra prediction modes not included in the mpm candidates (and planar mode) based on the remaining intra prediction mode information. The mpm list can be configured to include or not include planar modes as candidates. For example, if the mpm list includes the planar mode as a candidate, the mpm list may have 6 candidates, and if the mpm list does not include the planar mode as a candidate, the mpm list may have 5 candidates. If the mpm list does not include a planar mode as a candidate, a non-planar flag (ex. intra_luma_not_planar_flag) indicating whether the intra prediction mode of the current block is not a planar mode may be signaled. For example, the mpm flag may be signaled first, and the mpm index and non-planar flag may be signaled when the value of the mpm flag is 1. Also, the mpm index may be signaled when the value of the non-planar flag is 1. Here, the fact that the mpm list is configured not to include the planar mode as a candidate is not that the planar mode is not mpm, but rather that the planar mode is always considered as mpm, so a not planar flag is first signaled to determine whether the planar mode is the planar mode, to check first.

For example, whether the intra prediction mode applied to the current block is among mpm candidates (and planar mode) or remaining mode may be indicated based on an mpm flag (ex. intra_luma_mpm_flag). A value of mpm flag 1 may indicate that the intra prediction mode for the current block is within mpm candidates (and planar mode), and a value of mpm flag 0 may indicate that the intra prediction mode for the current block is not within mpm candidates (and planar mode). A value of not planar flag (ex. intra_luma_not_planar_flag) 0 may indicate that the intra prediction mode of the current block is the planar mode, and a value of not planar flag 1 may indicate that the intra prediction mode of the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of all intra prediction modes by indexing remaining intra prediction modes not included in mpm candidates (and planar mode) in order of prediction mode number. The intra prediction mode may be an intra prediction mode for a luma component (sample). Hereinafter, intra prediction mode information may include at least one of mpm flag (ex. intra_luma_mpm_flag), not planar flag (ex. intra_luma_not_planar_flag), mpm index (ex. mpm_idx or intra luma mpm_idx), or remaining intra prediction mode information (rem_intra_luma_pred_mode or intra_luma_mpm_remainder). In this document, the mpm list may be called various terms such as an mpm candidate list, a candidate mode list (candModeList), and a candidate intra prediction mode list.

Figure 10:
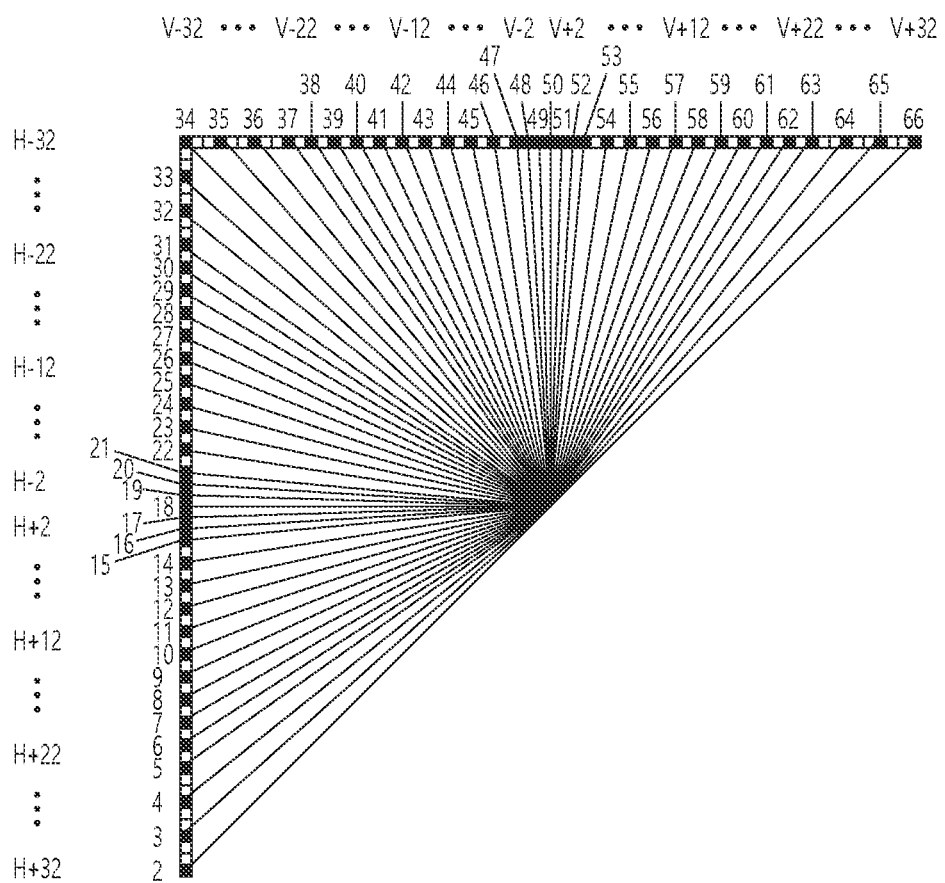
FIG. 10 illustrates an example of intra prediction modes to which embodiments of the present disclosure may be applied.

FIG. 10 illustrates an example of intra prediction modes to which embodiments of the present disclosure may be applied.

Referring to FIG. 10, an intra prediction mode with horizontal direction and an intra prediction mode with vertical direction can be distinguished around inntra prediction mode no. 34 with a upward-left diagonal prediction direction. H and V of FIG. 8 refer to horizontal and vertical directions, respectively, and numbers −32 to 32 represent displacements of 1/32 units on a sample grid position. Intra prediction modes 2 to 33 have horizontal directionality, and intra prediction modes 34 to 66 have vertical directionality. The 18th and 50th intra prediction modes represent horizontal intra prediction modes and vertical intra prediction modes, respectively, while the 2nd intra prediction mode is called the downward-left diagonal intra prediction mode, and the 34th intra prediction mode may be referred to as an upper-left diagonal intra prediction mode, and the 66th intra prediction mode may be referred to as an upper-left diagonal intra prediction mode.

Hereinafter, a Decoder Side Intra Mode Derivation (DIMD) mode, which is a method of intra prediction, will be described.

For example, DIMD modes include Decoder Side Intra Mode Derivation mode, Decoder Intra Mode Derivation mode, Decoder Side Intra Prediction Mode, and Decoder Intra Mode Prediction mode. (Decoder Intra Prediction Mode).

Also, for example, the DIMD mode may be referred to as a DIMD intra mode. Also, the DIMD mode may be referred to as a DIMD intra prediction mode or a DIMD prediction mode.

Also, for example, intra mode may be referred to as intra prediction mode in this document. In addition, intra mode and intra prediction mode may be used interchangeably.

Meanwhile, in existing video codecs such as HEVC and VVC, an intra prediction mode is signaled through a bitstream. The amount of overhead of the intra prediction mode may vary depending on several factors (ie quantization parameters, video characteristics, etc.). Table 1 below shows overhead in intra prediction mode.

TABLE 1

| QP | % of bits used to code INTRA_DIR_ANG Bit | Division of the % of bits used for Angular Direction |
|---|---|---|
| QP22 | INTRA_DIR_ANG Bit 4.87% | INTRA_DIR_MPM_FLAG Bit 0.74% |
| | | INTRA_DIR_LUMA_MPM Bit 1.61% |
| | | INTRA_DIR_LUMA_NON_MPM Bit 1.41% |
| | | INTRA_DIR_CHROMA Bit 1.11% |
| QP27 | INTRA_DIR_ANG Bit 7.19% | INTRA_DIR_MPM_FLAG Bit 1.16% |
| | | INTRA_DIR_LUMA_MPM Bit 2.49% |
| | | INTRA_DIR_LUMA_NON_MPM Bit 2.17% |
| | | INTRA_DIR_CHROMA Bit 1.37% |
| QP32 | INTRA_DIR_ANG Bit 9.22% | INTRA_DIR_MPM_FLAG Bit 1.55% |
| | | INTRA_DIR_LUMA_MPM Bit 3.24% |
| | | INTRA_DIR_LUMA_NON_MPM Bit 2.89% |
| | | INTRA_DIR_CHROMA Bit 1.54% |
| QP37 | INTRA_DIR_ANG Bit 11.37% | INTRA_DIR_MPM_FLAG Bit 1.93% |
| | | INTRA_DIR_LUMA_MPM Bit 3.91% |
| | | INTRA_DIR_LUMA_NON_MPM Bit 3.57% |
| | | INTRA_DIR_CHROMA Bit 1.96% |
| Average | INTRA_DIR_ANG Bit 8.16% | INTRA_DIR_MPM_FLAG Bit 1.35% |
| | | INTRA_DIR_LUMA_MPM Bit 2.81% |
| | | INTRA_DIR_LUMA_NON_MPM Bit 2.51% |
| | | INTRA_DIR_CHROMA Bit 1.49% |

Referring to Table 1, on average, about 8.15% of bits are used to code the intra prediction mode. Although this represents a statistic derived from the VVC reference software VTM version 10, it should be taken into account that this trend can be observed regardless of the video standard. Also, this trend suggests that the overhead of intra mode signaling is non-negligible.

Meanwhile, unlike the above-described conventional intra prediction mode signaling, a decoder side intra mode derivation (DIMD) method is introduced in this document. Here, DIMD means an intra coding tool in which a luma intra prediction mode (IPM) is not transmitted through a bitstream. Instead, the luma intra prediction mode is derived using previously encoded/decoded pixels in both the encoder and decoder.

For example, the DIMD mode is selected as the best mode in the encoder when the corresponding RD cost is the minimum among all other intra modes. In the decoder, each CU may check whether the DIMD mode is applied. For example, DIMD flag information may be signaled to indicate the DIMD mode. In addition, it may indicate whether the CU derives the DIMD intra mode by another method.

When a CU is coded with DIMD mode, the decoder can derive DIMD intra mode. For example, the DIMD intra mode (or DIMD mode) may be derived during a reconstruction process using previously decoded neighboring pixels. Also, the DIMD mode may be derived using other techniques or other processes.

When the DIMD mode is not selected in the decoder, information on the intra mode that can be parsed from the bitstream may relate to the existing intra mode. For example, the information on the intra mode may be at least one of an MPM flag, an MPM index, or remaining mode information.

For example, the DIMD flag information may be parsed/signaled before the MPM flag. Also, for example, DIMD flag information may be parsed/signaled between MPM flag information and MPM index information. For example, when DIMD flag information is parsed/signaled between MPM flag information and MPM index information, DIMD flag information may be parsed/signaled when the value of MPM flag information is 1.

Figure 11:
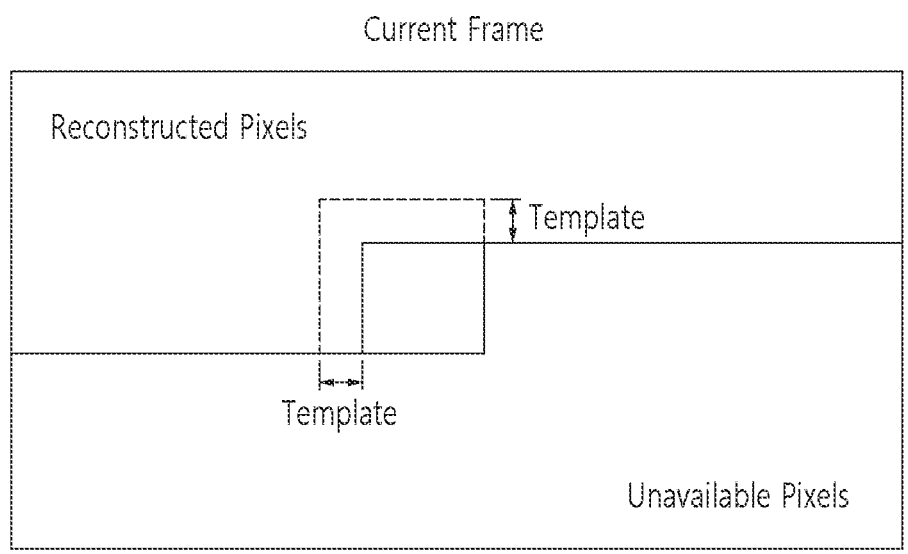
FIG. 11 exemplarily illustrates a reconstructed pixel template.

FIG. 11 exemplarily illustrates a reconstructed pixel template.

Referring to FIG. 11, a DIMD mode for a current CU may be derived using a reconstructed pixel template. For example, the DIMD mode may be derived by calculating direction information between reconstructed pixels assuming that the angular direction of the template is highly correlated with the direction of the current block.

For example, the amount of gradients can be used to measure the DIMD mode. In this case, the amount of the gradient may be represented by a histogram. For example, the DIMD mode can be estimated based on intensity and orientation that can be calculated from adjacent reconstructed pixels of the current block. In this case, the intensity may be indicated by G, and the direction may be indicated by O. In this case, the intensity may mean amplitude.

Meanwhile, the Sobel filter may also be called a Sobel operator, and is an efficient filter for edge detection. When using a Sobel filter, there are two types of Sobel filters available: a Sobel filter for vertical direction and a Sobel filter for horizontal direction.

For example, for each pixel in the template. Sobel filters use the window centered at the current pixel to calculate x (i.e., Mx) and y (That is, it can be applied in My) direction.

The Mx and the My can be calculated through the following equation.

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix} \quad \text{[Equation 1]}$$

In addition, the amplitude and the direction can be calculated through the following equation.

$$G = |G_x| + |G_y| \text{ and } O = \operatorname{atan}\left(\frac{G_y}{G_x}\right) \quad \text{[Equation 2]}$$

The direction of the gradient may be converted into an intra-angular prediction mode. For example, a histogram value in an intra-angle mode may be increased by G, and gradient intensity values for each intra-angle mode may be accumulated. A mode showing the highest peak in the histogram is selected as an intra prediction mode for the current block. For example, a mode showing the highest peak in the histogram may be selected as the DIMD mode for the current block.

To investigate how DIMD is considered and how it may be incorporated into future video coding standards, several aspects may need to be considered. For example, it can include new DIMD modes that can be derived using available surroundings and/or other parameters. It may also include new DIMD modes that may be derived using, for example, available neighboring pixels and/or other parameters. In addition, for example, a new DIMD mode may be signaled such that it aligns with structure of the video codec under consideration and the overhead it may introduce may not be significant. In addition, for example, signaling so that there is no parsing waiting time may be considered. However, the above-described new DIMD mode is considered, but is not limited thereto.

Accordingly, this disclosure proposes the following embodiments to improve DIMD based intra coding. The proposed embodiments can be applied individually or in combination.

For example, in this document, when the value of specific information is 1, it may mean that the specific information is available. Also, for example, when the value of the specific information is 1, it may mean that the specific information is enabled.

Also, for example, if the value of specific information is 0 in this document, it may mean that the specific information is not available. Also, for example, when the value of the specific information is 0, it may mean that the specific information is disabled.

In addition, in this document, deriving an intra mode may mean deriving an intra prediction mode.

Meanwhile, DIMD related information may be used. For example, the DIMD related information may include DIMD flag information indicating whether DIMD mode is applied to the current block. In here, the DIMD flag information may be dimdFlag.

For example, when the value of the DIMD flag information is 1, the DIMD flag information may be used to indicate that an intra mode of a current coding unit (CU) will be derived using a DIMD mode operation. Or, in other words, when the value of the DIMD flag information is 1, the DIMD flag information may be used to indicate that the intra mode for the DIMD mode is to be derived.

Alternatively, for example, when the value of the DIMD flag information is 0, it may indicate that the intra mode of the current CU is not derived and an existing intra coding technique can be used. In other words, when the value of the DIMD flag information is 0, an intra mode for the DIMD mode is not derived, and an existing intra coding technique can be used.

For example, the prediction signal from several/all potential estimated intra modes and/or several/all intra angle modes and/or planar and DC modes may be combined to achieve the final intra prediction signal, can be combined to achieve. For example, several modes which can bring about a smoothing effect that can improve overall quality may be combined.

In addition, for example, it may be possible to combine several/all potentially derived modes (up to n modes) derived using equal weights. In here, these weights can be represented using the set W ε{$w_1, w_2, \ldots, w_n$}.

In addition, for example, because a planar mode and a DC mode typically occur with higher prevalence, it may be possible to combine several/all potentially derived modes with either one or both of these modes. In other words, it is possible to combine potentially derived modes with a planar mode, or potentially derived modes with a DC mode, or potentially derived modes with both a planar mode and a DC mode.

In addition, for example, it may be possible to combine potential intra modes obtained by using an unequal weight distribution.

In addition, for example, it may be possible to compute a weighted average using the planar mode and the most likely estimated mode.

In addition, for example, it may be possible to compute a weighted average using the planar mode and the second most likely estimated mode.

In addition, for example, it may be possible to compute a weighted average using only the most likely estimated mode and the second most likely mode.

In addition, for example, it may be possible to use several combinations to compute the weighted average. In here, this may be referred to as a "weighted order". Alternatively, it may be referred to as a "blend order". Some examples of blend orders where the four modes are considered may be as follows. At this time, it may be possible to use subsets of modes, that is, three modes, two modes, etc.

a. For example, combine {mode 1 with mode 2 with Planar mode having a weight of ⅓}, followed by {mode 1+mode 2}, followed by {mode 1+Planar mode having a weight of ⅓ weight}, and followed by {mode 2 and planar mode having a weight of ⅓}.

b. Also, for example, combine {mode 1 and mode 2}, combine {mode 2 and planar mode having a weight of ⅓}, and combine {mode 1 and planar mode having a weight of ⅓}, and combine {mode 1 and mode 2 and planar mode having a weight of ⅓}.

c. Also, for example, combine {mode 1 and mode 2}, combine {mode 2 and planar mode having a weight of ⅓}, combine {mode 1 and planar mode having a weight of ⅓}, and combine {mode 1 and mode 2 and planar mode having a weight of ⅚}.

d. Also, for example, combine {mode 1 and mode 2 and planar mode having a weight of ⅔}, combine {mode 1 and mode 2}, combine {mode 1 and planar mode having a weight of ⅓}.

e. Also, for example, combine {mode 1 and mode 2 and planar mode having a weight of ⅓}, combine {mode 1 and mode 2}, and combine {mode 2 and planar mode having a weight of ⅓}, and combine {mode 1 and planar mode having a weight of ⅓}.

f. Also, for example, combining {mode 1 and mode 2}, combine {mode 2 and planar mode having a weight of ⅓}, combine {mode 1 and mode 2 and planar mode having a weight of ⅚}, and combine {mode 1 and planar mode having a weight of ⅓}.

In here, the blend order in which multiple modes are considered is not limited to the above example, and when combining the modes in the blend order, the sum of the weights for each mode may be 1.

In addition, for example, it may be possible to use a combination of equal and unequal weighted predictions and/or other combinations for the CU.

In addition, for example, it may be possible to use an index as a pre-determined list containing weights.

In addition, for example, it may be possible to allow the user specified weights.

In addition, for example, by examining or extrapolating the nature of the statistics of the corresponding block, it may be possible to facilitate implicit inference or explicit signaling about whether to use weighted prediction and the type of weighted prediction used in the CU. for example:

a. Mode angle difference between the primary mode and secondary mode derived from the intra-mode estimating (prediction) algorithm may be used to determine the type of weighted averaging scheme to be use. For example, if the mode angle difference is below a threshold T, the weighted average prediction signal may be computed using one of the techniques listed above.

In addition, for example, it may also be possible to use other aspects of the CU, such as mode amplitude to determine the weighted intra prediction technique to be used. For example, if the amplitude difference between the primary mode and the secondary mode, estimated intra modes, is greater than or equal to a threshold', it may be possible to use any one or multiple techniques mentioned above.

In addition, for example, weights may be applied to the CU by considering the ratio of the amplitude of the primary mode and the secondary mode. For example, the ratio of the amplitude of the primary mode and secondary mode may be computed and compared to a threshold T to determine which of the weighted averaging techniques mentioned above that may be used to generate the final prediction.

In addition, for example, it may be possible to determine how the weighted average prediction signal is computed using luma intensities and/or other parameters.

In addition, for example, it may be possible to determine subsets of weights applied by considering other types of block statistics. For example, if a width and a height of a block meet certain predetermined conditions, a particular set of weights $W_1$ may be applied.
  a. For example, similarly, if a width and a height of a block do not meet the same criteria, another set of weights, denoted $W_2$, may be applied to the same block.

In addition, for example, it is possible to adjust weights on at a pixel granularity. For example, each pixel may be assigned a weight either same or distinct to compute.
  a. For example, these individual pixel based weights may be computed based on pixel positions within a block and the intra angular mode direction.
  b. Alternatively, it may be calculated in another possible way, in proportion to the distance from the block boundaries.

In addition, for example, the signaling of the weights, i.e. W, may be explicit or implicit, where the values may be computed intrinsically
  a. For example, a combination of explicit and implicit signaling may be used to determine the values of the weights to be used.
    i. Typically in these cases, it may be possible to signal a small subset of the information needed to compute the weights, and use that information to further derive the final weights to be used.
  b. For example, these statistics for deriving weights may be computed per CU or per slice or per frame or other appropriate intervals.
  c. For example, it may also be possible to allow a use specified weight combination that may be signaled. For example, in VVC this type of signaling may be accommodated in the SPS, PPS, APS, PH, SH, CU-level and/or other appropriate levels.
  d. for example, explicit signaling of any necessary parameters may be context coded, fixed length coded and/or signaled appropriately.

In addition, for example, in another aspect of signaling, signaling of DIMD flag and modes may be context coded.
  a. For example, if a DIMD mode were to be chosen from four potential DIMD modes, it may be possible to select the best DIMD mode using an RD cost estimation process.
  b. For example, if the best mode is not the first mode, it may be possible to encode both the DIMD flag and DIMD index using Truncated Unary coding.

In addition, for example, it may be possible to encode the DIMD flag using a single or several context models and encode the DIMD index using the remaining bins. Additionally, it may be possible to encode the DIMD flag using a single or several context models, or the DIMD index using the remaining bins.
  a. For example, it can be noted that the choice of context bins and the number of bins to be used may be guided by underlying block statistics. For example, a 4×4 block may use one context model, while an 8×8 block may use a different context model. Additionally, other appropriate statistics may also be used to guide the selection of context models.

In addition, for example, it may be possible to use specialized initialization values for additional context models under consideration. For example, initialization values can be determined based on block statistics.

Meanwhile, in this document, the parsing order of information/syntax elements may correspond to the signaling order of information/syntax elements. Also, for example, a sequence of information/syntax elements in this document may correspond to a sequence of information/syntax elements.

Figure 12:
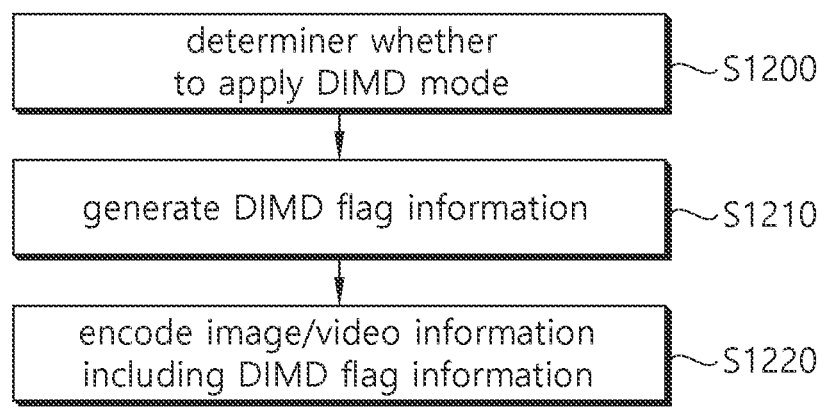
FIG. 12 exemplarily illustrates a video/image encoding process by an encoding apparatus to which an embodiment proposed in this disclosure is applied.

FIG. 12 exemplarily illustrates a video/image encoding process by an encoding apparatus to which an embodiment proposed in this disclosure is applied.

At least one of the steps of FIG. 12 may be omitted or changed.

Referring to FIG. 12, the encoding apparatus determines whether the DIMD mode is applied (S1200). For example, the encoding apparatus can determine whether the DIMD mode is applied. Also, for example, the encoding apparatus may determine whether the DIMD mode is applied to the current block based on DIMD related information. In this case, the DIMD related information may include DIMD flag information.

The encoding apparatus generates DIMD flag information (S1210). For example, the encoding apparatus may generate DIMD flag information. The DIMD flag information may include a DIMD flag. In this case, a syntax element of the DIMD flag information may be dimdFlag.

For example, when the value of the DIMD flag information is 1, the DIMD flag information can be used to indicate that the intra prediction mode of the current coding unit (CU) will be derived using the DIMD mode operation. Also, for example, when the DIMD mode is applied to the current block, an intra prediction mode for the DIMD mode may be derived based on neighboring reference samples of the current block.

Alternatively, for example, when the value of the DIMD flag information is 0, it may indicate that the intra prediction mode of the current CU is not derived based on the DIMD mode, and the existing intra coding technique can be used. For example, when the value of the DIMD flag information is 0, an intra prediction mode may be derived based on the MPM flag information. In addition, when the value of the MPM flag information is 1, an intra prediction mode may be derived based on the MPM mode, and when the value of the MPM flag information is 0, an intra prediction mode may be derived based on a non-MPM mode. there is.

Alternatively, for example, the DIMD flag information may be parsed after intra luma reference index information is parsed. Also, for example, the DIMD flag information may be parsed before the intra luma reference index information is parsed. Here, for example, the intra luma reference index information may be configured to be parsed based on a value of the DIMD flag information being 0.

Alternatively, for example, the DIMD flag information may be parsed after intra subpartition information is parsed.

Also, for example, the DIMD flag information may be parsed before the intra subpartition information is parsed. Here, for example, the intra subpartition information may be configured to be parsed based on a value of the DIMD flag information being 0.

Alternatively, for example, the DIMD flag information may be parsed after MIP flag information is parsed. Also, for example, the DIMD flag information may be parsed before the MIP flag information is parsed. Here, for example, the intra MIP flag information may be configured to be parsed based on a value of the DIMD flag information being 0.

The encoding apparatus encodes video/image information including DIMD flag information (S1220). For example, the encoding apparatus may encode video/video information including DIMD flag information.

Figure 13:
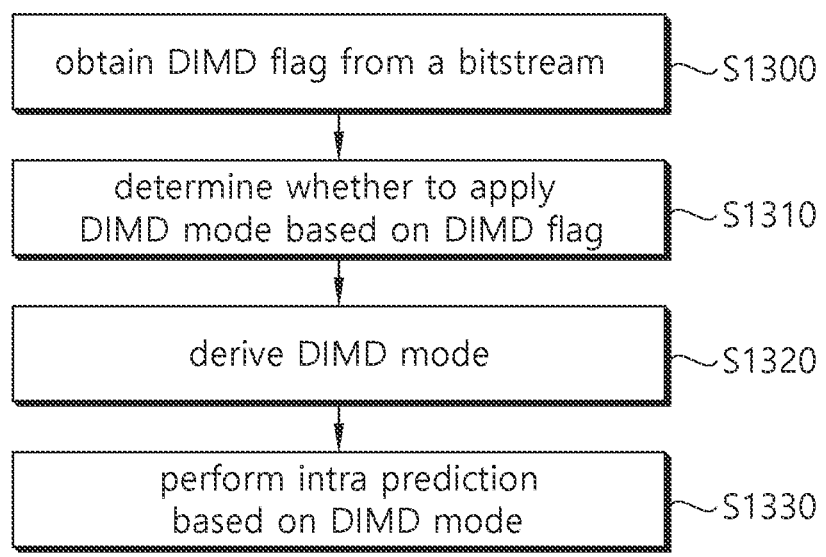
FIG. 13 exemplarily illustrates a video/image decoding process by a decoding apparatus to which an embodiment proposed in this disclosure is applied.

FIG. 13 exemplarily illustrates a video/image decoding process by a decoding apparatus to which an embodiment proposed in this disclosure is applied At least one of the steps of FIG. 13 may be omitted or changed.

Referring to FIG. 13, the decoding pparatus obtains DIMD flag information from the bitstream (S1300). For example, the decoding apparatus may obtain DIMD flag information from the bitstream. Also, for example, although DIMD-related information may be included in the bitstream, the DIMD-related information may include the DIMD flag information.

For example, the DIMD flag information may be parsed after intra luma reference index information is parsed. Also, for example, the DIMD flag information may be parsed before the intra luma reference index information is parsed. Here, for example, when the value of the DIMD flag information is 0, the intra luma reference index information may be parsed.

Alternatively, for example, the DIMD flag information may be parsed after intra subpartition information is parsed. Also, for example, the DIMD flag information may be parsed before the intra subpartition information is parsed. Here, for example, when the value of the DIMD flag information is 0, the intra subpartition information may be parsed.

Alternatively, for example, the DIMD flag information may be parsed after MIP flag information is parsed. Also, for example, the DIMD flag information may be parsed before the MIP flag information is parsed. Here, for example, when the value of the DIMD flag information is 0, the MIP flag information may be parsed.

The decoding apparatus determines whether the DIMD mode is applied based on the DIMD flag information (S1310). For example, the decoding apparatus may determine whether the DIMD mode is applied based on DIMD flag information. For example, when the value of the DIMD flag information is 1, the DIMD flag information can be used to indicate that the intra prediction mode of the current coding unit (CU) will be derived using the DIMD mode operation.

Alternatively, for example, when the value of the DIMD flag information is 0, it may indicate that the intra prediction mode of the current CU is not derived based on the DIMD mode, and the existing intra coding technique can be used. For example, when the value of the DIMD flag information is 0, an intra prediction mode may be derived based on the MPM flag information. In addition, when the value of the MPM flag information is 1, an intra prediction mode may be derived based on the MPM mode, and when the value of the MPM flag information is 0, an intra prediction mode may be derived based on a non-MPM mode.

The decoding apparatus derives the DIMD mode (S1320). For example, the decoding apparatus may derive the DIMD mode. Also, for example, when the DIMD mode is applied to the current block, an intra prediction mode for the DIMD mode may be derived based on neighboring reference samples of the current block.

In here, the DIMD mode may represent an intra prediction mode derived using the DIMD technique. Additionally, DIMD mode may be called DIMD intra mode or DIMD intra prediction mode. Additionally, DIMD mode, DIMD intra mode, or DIMD intra prediction mode can be used interchangeably. Additionally, the DIMD mode may include one or more intra prediction modes.

The decoding apparatus may perform intra prediction based on the DIMD mode (S1230). For example, the decoding apparatus may perform intra prediction by deriving an intra prediction mode for the DIMD mode.

Meanwhile, DIMD flag information may be signaled/ parsed in various ways. For example, the DIMD flag information may be parsed after intra luma reference index information and intra subpartitions information are parsed, but before MPM flag information is parsed. Also, for example, the DIMD flag may be parsed after intra luma reference index information, intra subpartition information, and MPM flag information are parsed. Also, for example, when the value of the MPM flag information is 0, the DIMD mode may be derived or the DIMD flag information may be parsed to indicate a non-MPM mode.

Meanwhile, neighboring reference samples are derived, and the neighboring reference samples may be used to perform intra prediction based on an intra prediction mode. In this case, the intra prediction mode may be for the DIMD mode. Also, neighboring blocks/samples may be used to derive the DIMD mode.

The encoding apparatus may perform intra prediction to generate prediction samples of the current block (S1330). Residual samples of the current block may be derived based on the prediction samples. Residual information related to the residual samples may be encoded and signaled to a decoding apparatus through a bitstream.

The decoding apparatus may generate a reconstructed sample/block/picture based on the prediction sample. Based on the residual information, the decoding device may derive residual samples, and a reconstructed sample/block/picture may be generated based on the residual samples. In addition, an in-loop filtering process may be applied to the reconstructed picture.

Figure 14:
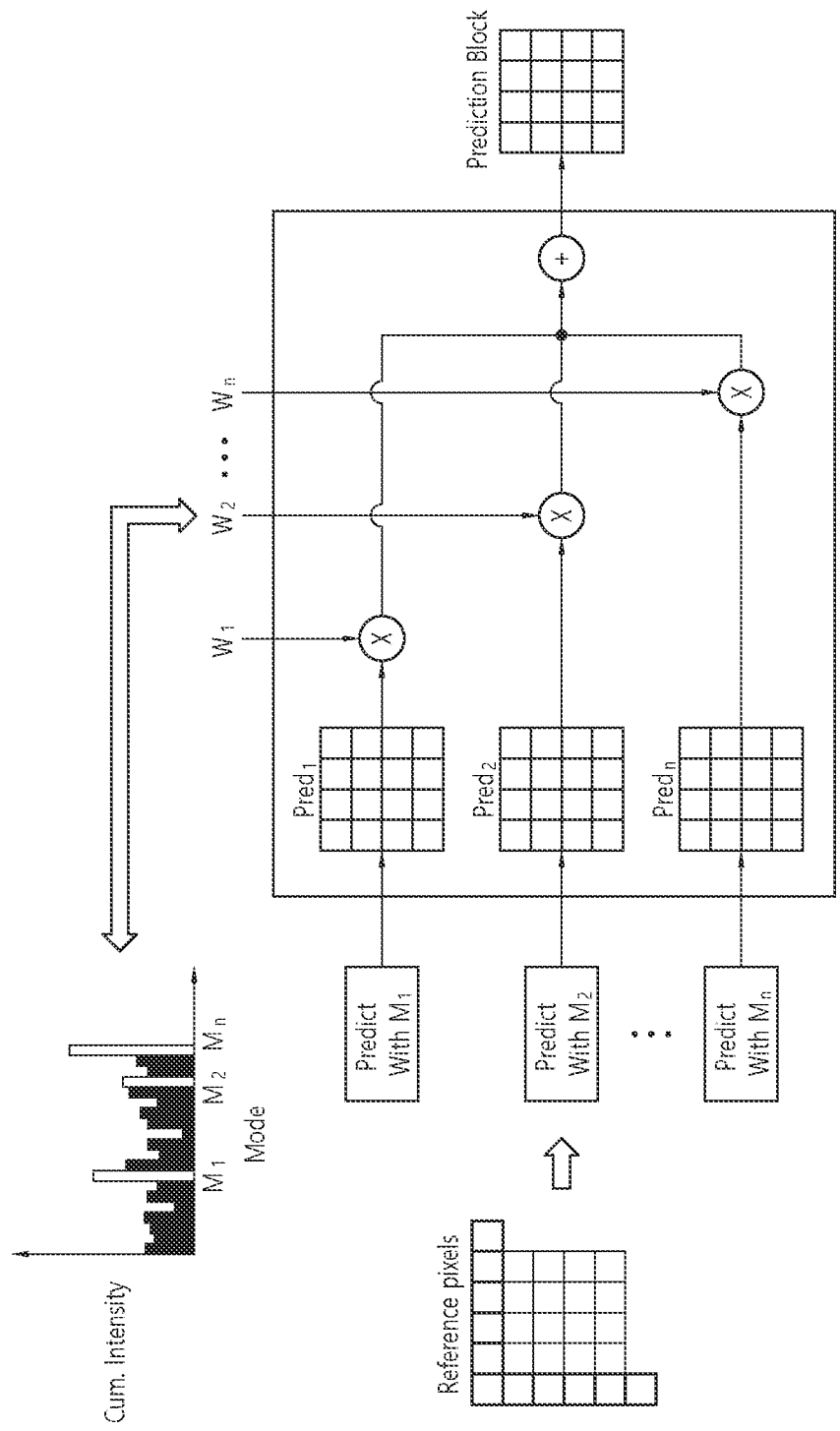
FIGS. 14 to 15 exemplarily illustrate an intra coding method according to an embodiment proposed in this disclosure.
Figure 15:
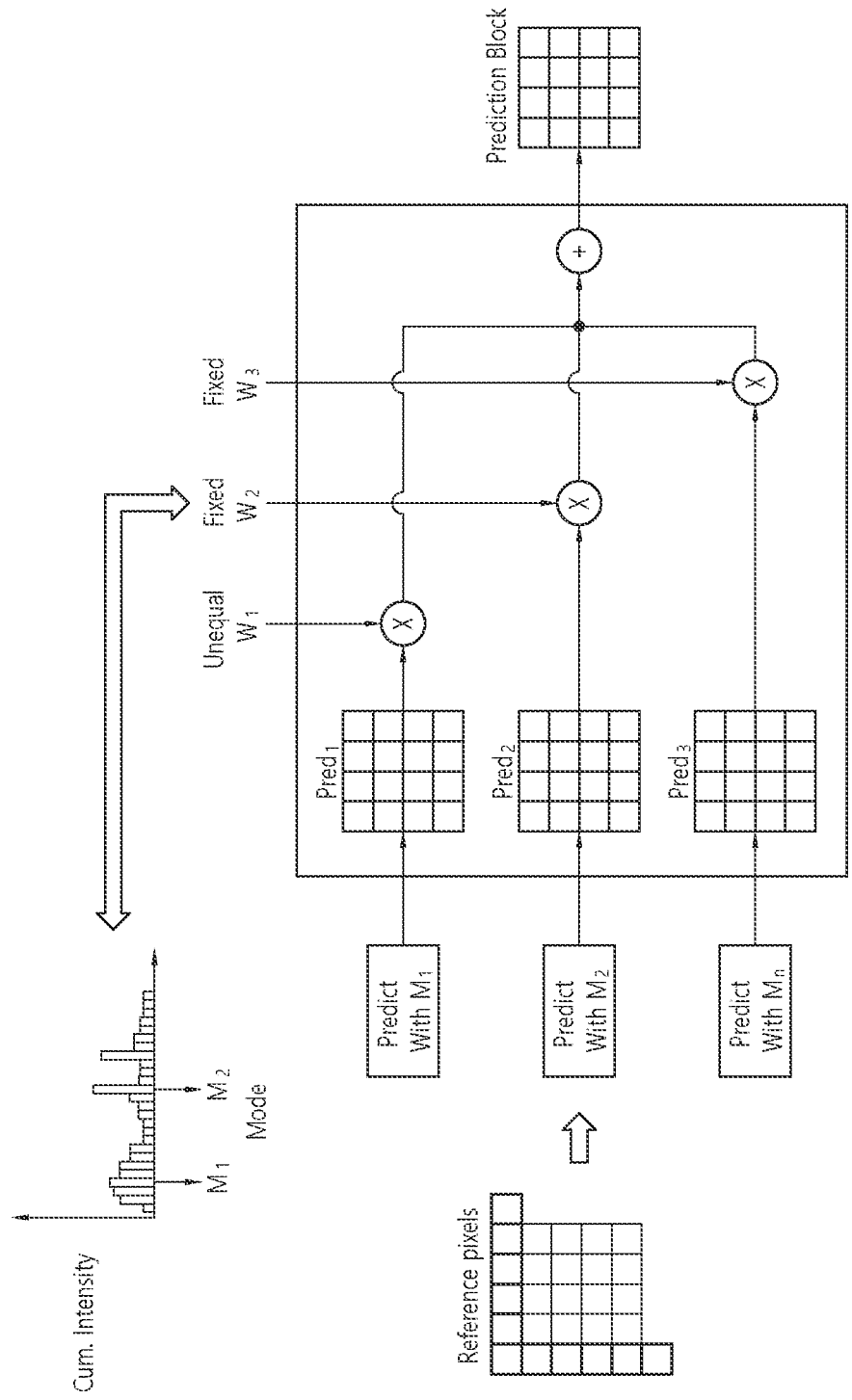

FIGS. 14 to 15 exemplarily illustrate an intra coding method according to an embodiment proposed in this disclosure.

Specifically, FIG. 14 illustrates an example where n dominant modes are combined in a histogram of intensities and then a cumulative prediction signal is generated as the final prediction signal according to an embodiment proposed in this disclosure.

For example, it may be postulated that performing weighted prediction provides a "smoothing" effect, thereby improving the accuracy of the prediction signal. Additionally, it can be postulated that the prediction signal may be generated using an averaging the prediction signal derived from either some or all of the modes that may be generated from HoG analysis. In here, the modes may be combined by using a weighted average. Additionally, these weights may be equal or may not be equal.

In addition, for example, n prediction samples may be generated using the n dominant modes in the intensity histogram. Additionally, a final prediction sample may be generated based on the n prediction samples. For example, the final prediction sample may be generated based on performing a weighted average of the n prediction samples. In other words, the final prediction sample may be generated based on performing a weighted average of the first prediction sample, the second prediction sample, . . . the n-th prediction sample. At this time, the weights applied to the prediction samples may be variously applied. For example, the weights applied to the n prediction samples may be the same, or may be different from each other, or may be partially the same.

FIG. 15 illustrates a possible structure that may be reviews in VVC according to an embodiment proposed in this disclosure.

For example, using a hybrid structure may increase the accuracy of the final prediction signal. For example, the first mode may be given the most importance by assigning it the highest weight, and the remaining n modes may have equally distributed weights such that the sum of all weights is equal to 1. In other words, the highest weight may be assigned to the first mode, and the remaining n modes may be equally weighted, but the sum of the weights for all modes may be 1.

In addition, for example, specifically three modes may be used. For example, a first mode, a second mode, or a third mode may be used. Here, a first prediction sample may be derived based on the first mode, a second prediction sample may be derived based on the second mode, and a third prediction sample may be derived based on the third mode.

In addition, for example, the final prediction sample may be generated based on the first prediction sample, second prediction sample, or third prediction sample of the current block. Here, the final prediction sample may be generated based on performing a weighted average based on at least two of the first prediction sample, the second prediction sample, or the third prediction sample of the current block.

Here, the weights for the prediction samples may be set in various way. For example, the weight for the first prediction sample, the weight for the second prediction sample, and the weight for the third prediction sample may be the same. Or, for example, a weight for the first prediction sample may be greater than weights for the remaining prediction samples, and a weight for the second prediction sample and a weight for the third prediction sample may be the same. At this time, the sum of the weights for the prediction samples may be set to 1.

Figure 16:
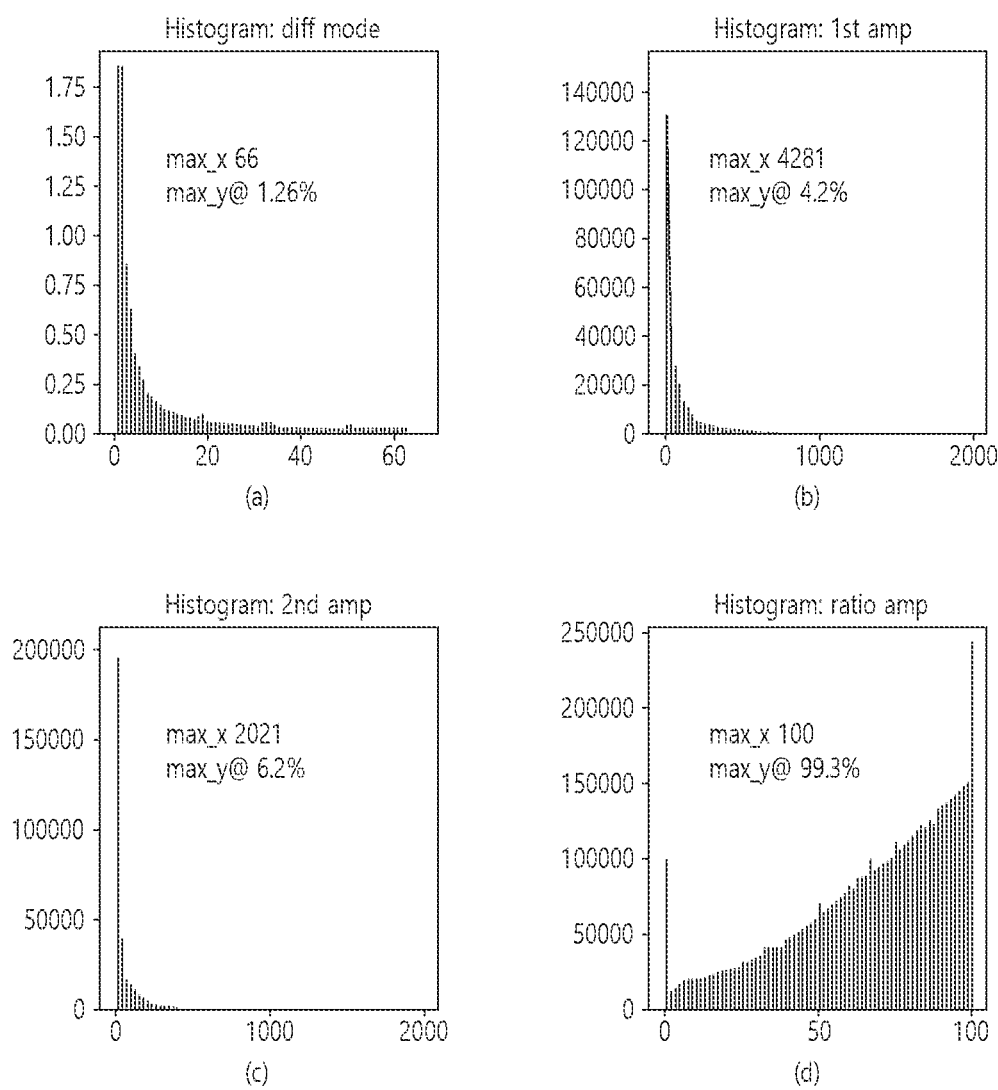
FIG. 16 illustrates block statistical analysis according to this disclosure, block statistical analysis according to the embodiment proposed in this disclosure.

FIG. 16 illustrates block statistical analysis according to this disclosure block statistical analysis according to the embodiment proposed in this disclosure.

It illustrates an example that may be used to guide how weights can be distributed.

For example, FIG. 16 illustrates several histogram plots of some statistics collected at the CU level. In particular, FIG. 16 (a) illustrates the difference in the angle between the first derived predicted intra mode and the second derived predicted intra mode. In general, small angle differences may mean that there is a strong correlation between the true intra mode characteristics of the block and the chaacterics of the derived mode(s).

Additionally, for example, FIG. 16(b) and FIG. 16(c) illustrate normalized histogram plots of amplitudes/intensities that may be derived using histogram of gradients (HoGs). At this time, these two plots may suggest that blocks would likely tend toward an intensity value of 0. This may mean that the block has similar directional attributes with that of pixels of the neighboring template T. Additionally, This may be attributed towards the fact that the sobel filters applied in either direction (i.e., x-direction and y-direction) are meant to capture the directional information.

Also, for example, FIG. 16(d) illustrates the ratio of the amplitude/intensities of the most likely mode and the second most likely mode. It may be possible to imply that while correlation between the derived modes exist, first mode may have more importance than the secondary derived mode in instances when the amplitude/intensity is not 0. This may be used as a guiding principle to determine the weights and how to may be applied.

Meanwhile, for example, some block statistics may be extracted to evaluate the coding of the DIMD flag and DIMD index.

For example, DIMD flag and DIMD index may be coded. In here, it may be possible to gauge some underlying statistics by extracting some block statistics.

Additionally, for example, when evaluating the coding of the DIMF flag and the DIMD index, samples of various statistical types may be considered. For example, the number of context models and their corresponding initialization values may be based on image/block class, image/block level dimension, quantization parameter, number of available neighboring neighbors, and/or other available characteristics.

Table 2 below illustrates the ratio of the number of blocks encoded in DIMD mode as a percentage to the total number of blocks encoded using a given block dimension, and Table 3 below illustrates the distribution of DIMD indexes according to various QPs.

TABLE 2

| | ClassB | | | |
|---|---|---|---|---|
| QP | 22 | 27 | 32 | 37 |
| 4 × 4 | 21.35 | 19.75 | 20.60 | 16.12 |
| 4 × 8 | 20.03 | 19.25 | 19.81 | 15.31 |
| 4 × 16 | 22.47 | 20.74 | 20.84 | 16.47 |
| 4 × 32 | 26.19 | 28.72 | 25.65 | 18.28 |
| 8 × 4 | 20.41 | 19.06 | 19.53 | 15.42 |
| 8 × 8 | 16.53 | 18.81 | 20.52 | 15.82 |
| 8 × 16 | 18.72 | 18.81 | 20.77 | 16.11 |
| 8 × 32 | 23.56 | 22.70 | 25.15 | 20.45 |
| 16 × 4 | 21.58 | 21.47 | 21.68 | 19.17 |
| 16 × 8 | 18.05 | 19.60 | 21.76 | 17.17 |
| 16 × 16 | 19.17 | 20.02 | 22.96 | 17.63 |
| 16 × 32 | 24.60 | 21.91 | 23.73 | 18.13 |
| 32 × 4 | 20.61 | 26.19 | 31.44 | 30.00 |
| 32 × 8 | 20.13 | 24.13 | 25.53 | 27.03 |
| 32 × 16 | 16.98 | 20.34 | 21.39 | 21.70 |
| 32 × 32 | 19.32 | 21.52 | 23.46 | 22.88 |
| 64 × 64 | 14.67 | 20.08 | 22.55 | 19.63 |
| 128 × 128 | 20.00 | 27.50 | 27.27 | 26.23 |

TABLE 3

| | Idx1 | Idx2 | Idx3 | Idx1 | Idx2 | Idx3 | Idx1 |
|---|---|---|---|---|---|---|---|
| ClassA1 | 29.11766 | 18.41478 | 52.46750 | 41.0665 | 27.25579 | 31.6777 | 63.91001 |
| ClassA2 | 36.11768 | 24.28289 | 39.59944 | 57.30313 | 27.00708 | 15.68979 | 52.72754 |
| ClassB | 38.55534 | 23.67902 | 37.76565 | 54.61576 | 25.80957 | 19.57467 | 66.39351 |

TABLE 3-continued

| | | | | | | | |
|---|---|---|---|---|---|---|---|
| ClassC | 43.54676 | 28.93874 | 27.51449 | 46.04076 | 30.4711 | 23.48814 | 50.70886 |
| ClassD | 54.03189 | 31.75399 | 14.21412 | 61.80791 | 26.83616 | 11.35593 | 72.571 |
| | 40.27386 | 25.41388 | 34.31225 | 52.16681 | 27.47594 | 20.35725 | 61.25218 |
| P(IDX) | 40.27 | 25.41 | 34.31 | 52.17 | 27.48 | 20.36 | 61.26 |

| | Idx2 | Idx3 | Idx1 | Idx2 | Idx3 |
|---|---|---|---|---|---|
| ClassA1 | 24.79967 | 11.29032 | 76.64348 | 18.55743 | 4.799091 |
| ClassA2 | 32.47109 | 14.80136 | 70.70386 | 23.3694 | 5.926735 |
| ClassB | 24.584 | 9.022494 | 76.5045 | 18.13836 | 5.357143 |
| ClassC | 37.01266 | 12.27848 | 65.23007 | 31.23785 | 3.53208 |
| ClassD | 22.12257 | 5.306428 | 75.61247 | 22.49443 | 1.893096 |
| | 28.198 | 10.53982 | 72.93888 | 22.75949 | 4.301629 |
| P(IDX) | 28.20 | 10.54 | 72.94 | 22.76 | 4.30 |

Referring to Table 2 above, it can be seen that the distribution of DIMD blocks is expressed as a percentage of blocks encoded in DIMD mode as a ratio of the total number of blocks encoded using a given block dimension. For example, it can be expressed as a ratio of the total number of DIMD blocks to the total number of 4×4 blocks. Additionally, data is collected for each class and QP, and it can be observed that on average 20% to 30% of each block shape is encoded in DIMD mode.

Additionally, referring to Table 3 above, statistics that may be derived to evaluate the percentage of DIMD blocks that are encoded with as first index, second index, and third index. These statistics may be used to derive the number of context models that may be used, along with initialization values and/or other aspects.

Figure 17:
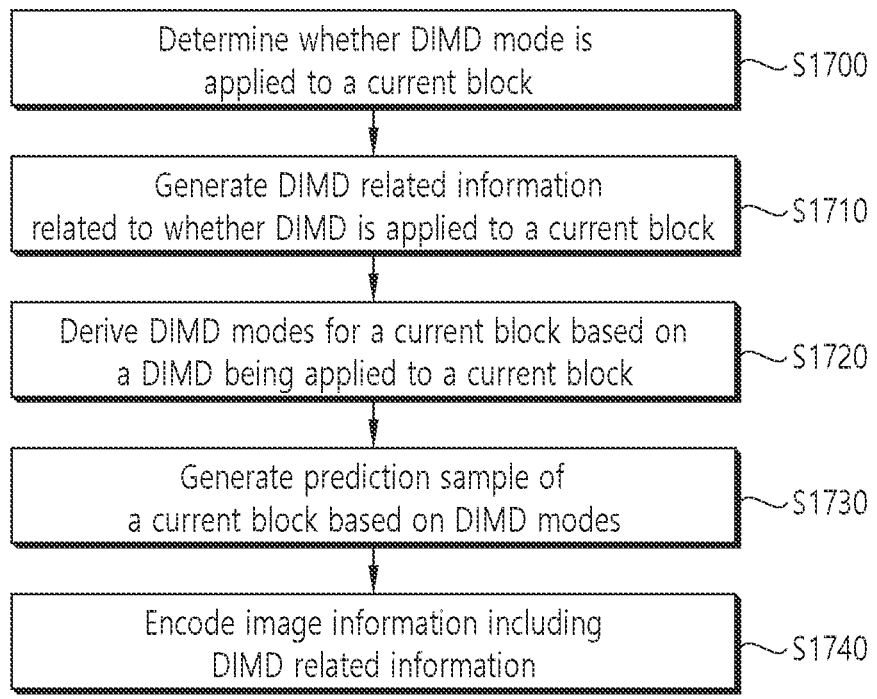
FIGS. 17 and 18 schematically illustrate an example of a video/image encoding method and related components according to an embodiment in this disclosure.
Figure 18:
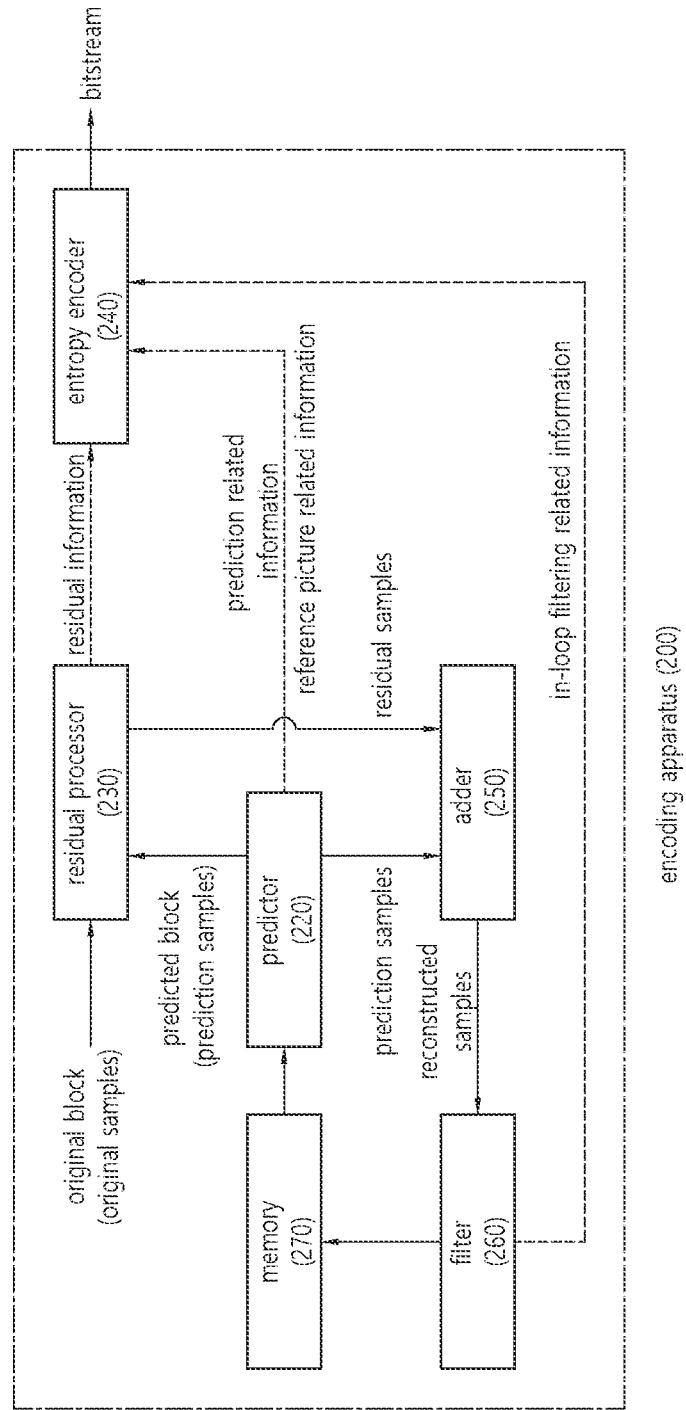

FIGS. 17 and 18 schematically illustrate an example of a video/image encoding method and related components according to an embodiment in this disclosure.

Figure 19:
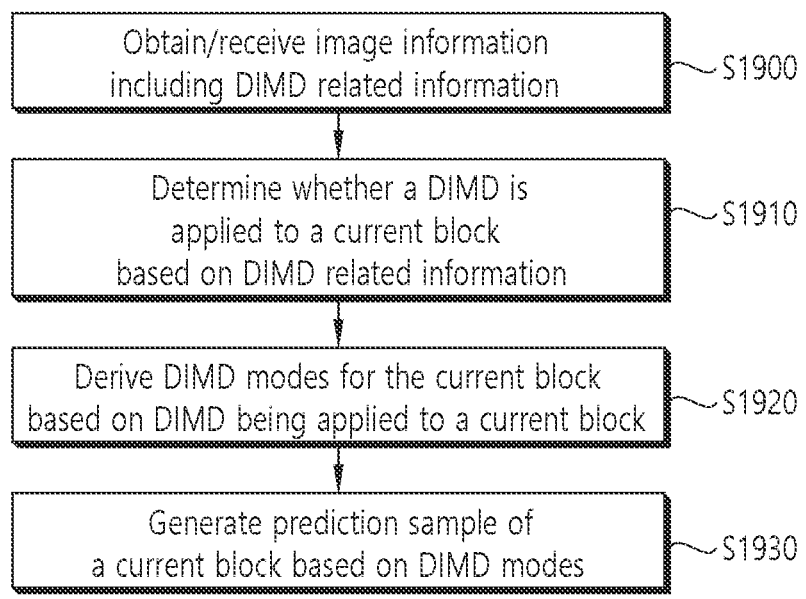
FIGS. 19 and 20 schematically illustrate an example of a video/image decoding method and related components according to an embodiment in this disclosure.

The method disclosed in FIG. 17 may be performed by a encoding apparatus disclosed in FIG. 2 or FIG. 19. Specifically, for example, S1700 to S1730 of FIG. 17 may be performed by the predictor 220 of the encoding apparatus of FIG. 18, and S1740 may be performed by the entropy encoder 240 of the encoding apparatus of FIG. 18. Further, although not illustrated in FIG. 17, prediction samples or prediction-related information may be derived by the predictor 220 of the encoding apparatus, and the bitstream may be generated from residual information or prediction related information by the entropy encoder 240 of the encoding apparatus. The method disclosed in FIG. 17 may include the above-described embodiments of the present document.

Referring to FIG. 17, the encoding apparatus may determine whether a DIMD (Decoder side Intra Mode Derivation) mode is applied to a current block (S1700). For example, the encoding apparatus may determine whether a DIMD is applied to the current block according to the above-described embodiment.

The encoding apparatus may generate DIMD-related information related to whether the DIMD is applied to the current block (S1710). For example, the encoding apparatus may generate the DIMD-related information for the current block according to the above-described embodiment. In this case, the DIMD-related information may include DIMD flag information.

The encoding apparatus may derive DIMD modes for the current block based on DIMD being applied to the current block (S1720). For example, the encoding apparatus may derive the DIMD modes for the current block based on DIMD being applied to the current block according to the above-described embodiment.

For example, when the DIMD modes are applied to the current block, the DIMD modes may be derived based on neighboring reference samples of the current block. Here, prediction samples can be generated based on the DIMD modes.

Additionally, for example, when the DIMD mode is not applied to the current block, the intra prediction mode may be derived based on prediction mode information Here, the prediction mode information may include at least one of Most Probable Mode (MPM) flag information, not planar flag information, MPM index information, or MPM reminder information information.

The encoding apparatus may generate a prediction sample based on DIMD modes (S1730). For example, the encoding apparatus may generate a prediction sample for the current block based on the DIMD modes according to the above-described embodiment.

For example, the prediction sample may be generated based on n prediction samples of the current block. For example, the prediction sample may be generated based on performing a weighted average based on the n prediction samples of the current block. That is, the prediction sample may be generated based on performing a weighted average based on the first prediction sample and the second prediction sample . . . the n prediction samples.

In addition, for example, the DIMD modes may include n DIMD modes. For example, the first prediction sample may be derived based on the first DIMD mode, the second prediction sample may be derived based on the second DIMD mode, and the n prediction sample may be derived based on the n DIMD mode.

Also, for example, the weights for the n prediction samples may or may not be the same as each other. That is, by setting various weights for the n prediction samples, prediction accuracy may be increased.

Alternatively, for example, the prediction sample may be generated based on the first prediction sample and the second prediction samples of the current block. Here, the prediction sample may be generated based on performing weighted average based on the first prediction sample and the second prediction sample of the current block.

In addition, for example, the DIMD modes may include a first DIMD mode and a second DIMD mode. Here, the first prediction sample may be derived based on the first DIMD mode, and the second prediction sample may be derived based on the second DIMD mode.

In addition, for example, the above DIMD modes can be derived based on the intensity derived using a Sobel filter based on the neighboring reference samples of the current block. In this case, the first DIMD mode may be related to the highest intensity, and the second DIMD mode may be related to the second highest intensity.

In addition, for example, various weights may be set for the first prediction sample and the second prediction sample. For example, the weight of the first prediction sample and the weight of the second prediction sample may be the same. In addition, the weight of the first prediction sample and the weight of the first prediction sample may be different. Accordingly, the weight of the first prediction sample may be greater or less than the weight of the second prediction sample. In this case, a sum of the weights of the first prediction sample and the weights of the second prediction sample may be 1. Various weights may be set for the first prediction sample and the second prediction sample without being limited to the examples described above.

Alternatively, for example, the prediction sample may be generated based on the first prediction sample, the second prediction sample, or the third prediction sample of the current block. Here, the prediction sample may be generated based on performing a weighted average based on at least two of the first prediction sample, the second prediction sample, or the third prediction sample of the current block.

In addition, for example, the DIMD modes may include at least one of the first DIMD mode, the second DIMD mode, or the third DIMD mode. Here, the first prediction sample may be derived based on the first DIMD mode, the second prediction sample may be derived based on the second DIMD mode, and the third prediction sample may be derived based on the third DIMD mode.

In addition, for example, the DIMD modes may be derived based on the intensity derived using a Sobel filter based on the neighboring reference samples of the current block. In this case, the first DIMD mode may be related to the highest intensity, and the second DIMD mode may be related to the second highest intensity. In addition, the third DIMD mode may be related to the third highest strength. Meanwhile, the third DIMD mode may be a DC mode or a planar mode.

In addition, for example, various weights can be set for the first prediction sample, the second prediction sample, and the third prediction sample. For example, the weight of the first predicted sample, the weight of the second predicted sample, and the weight of the third predicted sample may be the same. In addition, only the weight of the second predicted sample and the weight of the third predicted sample may be the same, and the weight of the first predicted sample may be different. In here, the weight of the first prediction sample may be greater than the weight of the second prediction sample, and the sum of the weight of the first prediction sample, the weight of the second prediction sample, and the weight of the third prediction sample may be 1. Various weights may be set for the first prediction sample, the second prediction sample, and the third prediction samples without being limited to the examples described above.

In addition, for example, a prediction sample may be generated based on one of the blend prediction samples. For example, the DIMD mode may include at least one of a first DIMD mode, a second DIMD mode, or a third DIMD mode. In addition, the blend prediction samples may include n blend prediction samples. Specifically, the blend prediction samples may include a first blend prediction sample, a second blend prediction sample, a third blend prediction sample, and a fourth blend prediction sample.

In this case, the first blend prediction sample may be derived based on performing a weighted average based on at least two of the first prediction sample, the second prediction sample, or the third prediction sample. In addition, the second blend prediction sample can be derived based on performing a weighted average based on at least two of the first prediction sample, the second prediction sample, or the third prediction sample. In addition, the third blend prediction sample can be derived based on performing a weighted average based on at least two of the first prediction sample, the second prediction sample, or the third prediction sample. In addition, the fourth blend prediction sample can be derived based on performing a weighted average based on at least two of the first prediction sample, the second prediction sample, or the third prediction sample.

In other words, each blend prediction sample may be derived based on performing a weighted average based on at least two of the first prediction sample, the second prediction sample, or the third prediction sample. In this case, the first prediction sample may be derived based on the first DIMD mode, the second prediction sample may be derived based on the second DIMD mode, and the third prediction sample may be derived based on the third DIMD mode.

In addition, for example, the first blend prediction sample may be derived based on performing a weighted average based on the above first prediction sample, the second prediction sample, and the third prediction sample. In this case, the sum of the weight of the first prediction sample and the weight of the second prediction sample may be ⅔ and the weight of the third prediction sample may be ⅓.

In addition, for example, the second blend prediction sample may be derived based on performing a weighted average of the first prediction sample and the second prediction sample. In this case, a sum of the weights of the first prediction sample and the weights of the second prediction sample may be 1.

In addition, for example, the third blend prediction sample may be derived based on performing a weighted average of the first prediction sample and the third prediction sample. In this case, the weight of the first prediction sample may be ⅔ and the weight of the third prediction sample may be ⅓.

The fourth blend prediction sample may be derived based on performing a weighted average of the second prediction sample and the third prediction sample. In this case, the weight of the second prediction sample may be ⅔ and the weight of the third prediction sample may be ⅓.

In addition, for example, the third DIMD mode may be a planar mode. Alternatively, for example, the third DIMD mode may be a DC mode.

In addition, for example, the DIMD-related information may include DIMD index information. In this case, the DIMD index information may be related to the blend prediction samples derived from the DIMD modes. Specifically, the DIMD index information may indicate one of the blend prediction samples.

The encoding apparatus encodes image information including DIMD-related information (S1740). For example, the encoding apparatus may decode image information including DIMD-related information. In this case, the DIMD-related information may include at least one of DIMD flag information or DIMD index information.

Figure 20:
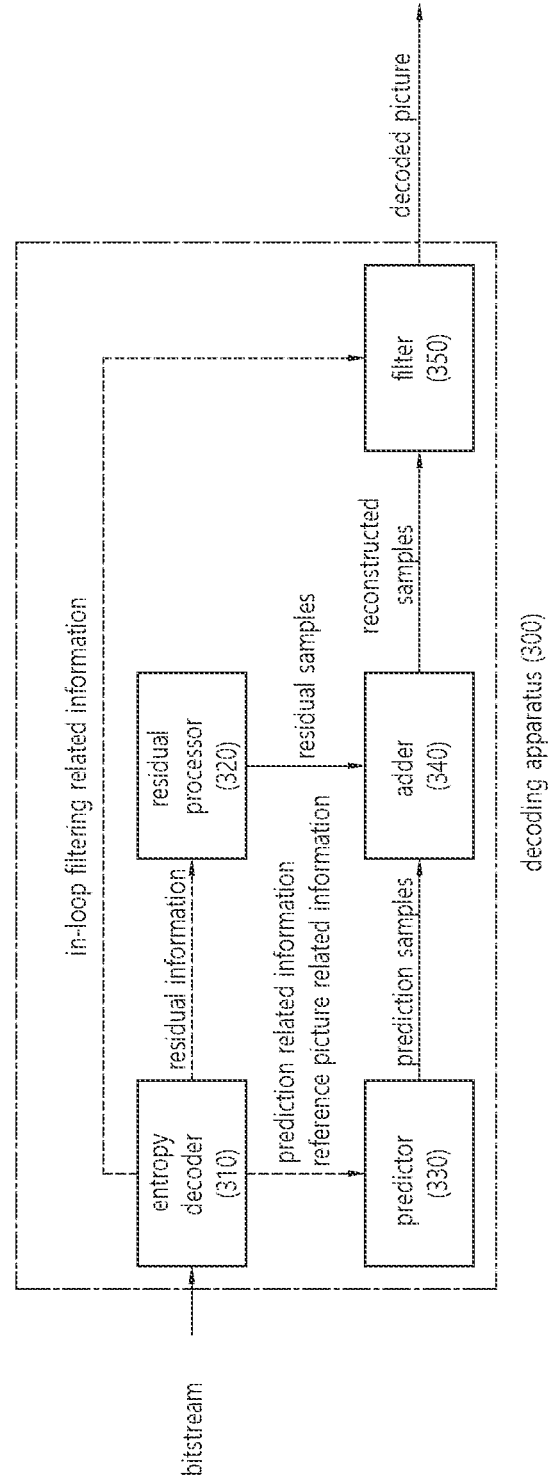

FIGS. 19 and 20 schematically illustrate an example of a video/image decoding method and related components according to an embodiment in this disclosure.

The method disclosed in FIG. 19 may be performed by a decoding apparatus disclosed in FIG. 3 or FIG. 20. Specifically, for example, S1900 of FIG. 12 may be performed by the entropy decoder 310 of the decoding apparatus, and S1910 to S1930 of FIG. 19 may be performed by the predictor 310 of the decoding apparatus. The method disclosed in FIG. 19 may include the above-described embodiments in the present document.

Referring to FIG. 19, the decoding apparatus may obtain/receive image information including decoder side intra mode deviation (DIMD) related information (S1900). For example, the decoding apparatus may obtain/receive image information including DIMD-related information according to the above-described embodiment. The DIMD-related information may include at least one of DIMD flag information or DIMD index information.

The decoding apparatus may determine whether to a DIMD is applied to the current block based on the DIMD-related information (S1910). For example, the decoding apparatus may determine whether the DIMD is applied to the current block based on the DIMD-related information according to the above-described embodiment.

The decoding apparatus may apparatus DIMD modes for the current block based on a DIMD being applied to the current block (S1920). For example, the above decoding apparatus may derive the DIMD modes for the current block based on the DIMD being applied to the current block according to the embodiment of this document.

For example, when the DIMD is applied to the above current block, the above DIMD modes may be derived based on the neighboring reference samples of the current block. Here, the prediction samples may be generated based on the DIMD modes.

In addition, for example, when the DIMD mode is not applied to the above current block, the intra prediction mode can be derived based on the prediction mode information. Here, the prediction mode information may include at least one of most programmable mode (MPM) flag information, not planar flag information, MPM index information, or MPM remainder information.

The decoding apparatus generates a prediction sample for the current block based on DIMD modes (S1930). For example, the decoding apparatus may generate a prediction sample for the current block based on the DIMD modes according to the above-described embodiment.

For example, the prediction sample may be generated based on n prediction samples of the current block. For example, the prediction sample may be generated based on performing a weighted average based on the n prediction samples of the current block. That is, the prediction sample may be generated based on performing a weighted average based on the first prediction sample and the second prediction sample . . . the n prediction samples.

In addition, for example, the DIMD modes may include n DIMD modes. For example, the first prediction sample may be derived based on the first DIMD mode, the second prediction sample may be derived based on the second DIMD mode, and the n prediction sample may be derived based on the n DIMD mode.

Also, for example, the weights for the n prediction samples may or may not be the same as each other. That is, by setting various weights for the n prediction samples, prediction accuracy may be increased.

Alternatively, for example, the prediction sample may be generated based on the first prediction sample and the second prediction samples of the current block. Here, the prediction sample may be generated based on performing weighted average based on the first prediction sample and the second prediction sample of the current block.

In addition, for example, the DIMD modes may include a first DIMD mode and a second DIMD mode. Here, the first prediction sample may be derived based on the first DIMD mode, and the second prediction sample may be derived based on the second DIMD mode.

In addition, for example, the above DIMD modes can be derived based on the intensity derived using a Sobel filter based on the neighboring reference samples of the current block. In this case, the first DIMD mode may be related to the highest intensity, and the second DIMD mode may be related to the second highest intensity.

In addition, for example, various weights may be set for the first prediction sample and the second prediction sample. For example, the weight of the first prediction sample and the weight of the second prediction sample may be the same. In addition, the weight of the first prediction sample and the weight of the first prediction sample may be different. Accordingly, the weight of the first prediction sample may be greater or less than the weight of the second prediction sample. In this case, a sum of the weights of the first prediction sample and the weights of the second prediction sample may be 1. Various weights may be set for the first prediction sample and the second prediction sample without being limited to the examples described above.

Alternatively, for example, the prediction sample may be generated based on the first prediction sample, the second prediction sample, or the third prediction sample of the current block. Here, the prediction sample may be generated based on performing a weighted average based on at least two of the first prediction sample, the second prediction sample, or the third prediction sample of the current block.

In addition, for example, the DIMD modes may include at least one of the first DIMD mode, the second DIMD mode, or the third DIMD mode. Here, the first prediction sample may be derived based on the first DIMD mode, the second prediction sample may be derived based on the second DIMD mode, and the third prediction sample may be derived based on the third DIMD mode.

In addition, for example, the DIMD modes may be derived based on the intensity derived using a Sobel filter based on the neighboring reference samples of the current block. In this case, the first DIMD mode may be related to the highest intensity, and the second DIMD mode may be related to the second highest intensity. In addition, the third DIMD mode may be related to the third highest strength. Meanwhile, the third DIMD mode may be a DC mode or a planar mode.

In addition, for example, various weights can be set for the first prediction sample, the second prediction sample, and the third prediction sample. For example, the weight of the first predicted sample, the weight of the second predicted sample, and the weight of the third predicted sample may be the same. In addition, only the weight of the second predicted sample and the weight of the third predicted sample may be the same, and the weight of the first predicted sample may be different. In here, the weight of the first prediction sample may be greater than the weight of the second prediction sample, and the sum of the weight of the first prediction sample, the weight of the second prediction sample, and the weight of the third prediction sample may be 1. Various weights may be set for the first prediction sample, the second prediction sample, and the third prediction samples without being limited to the examples described above.

In addition, for example, a prediction sample may be generated based on one of the blend prediction samples. For example, the DIMD mode may include at least one of a first DIMD mode, a second DIMD mode, or a third DIMD mode. In addition, the blend prediction samples may include n blend prediction samples. Specifically, the blend prediction samples may include a first blend prediction sample, a second blend prediction sample, a third blend prediction sample, and a fourth blend prediction sample.

In this case, the first blend prediction sample may be derived based on performing a weighted average based on at least two of the first prediction sample, the second prediction sample, or the third prediction sample. In addition, the second blend prediction sample can be derived based on performing a weighted average based on at least two of the first prediction sample, the second prediction sample, or the third prediction sample. In addition, the third blend prediction sample can be derived based on performing a weighted average based on at least two of the first prediction sample, the second prediction sample, or the third prediction sample. In addition, the fourth blend prediction sample can be derived based on performing a weighted average based on at least two of the first prediction sample, the second prediction sample, or the third prediction sample.

In other words, each blend prediction sample may be derived based on performing a weighted average based on at least two of the first prediction sample, the second prediction sample, or the third prediction sample. In this case, the first prediction sample may be derived based on the first DIMD mode, the second prediction sample may be derived based on the second DIMD mode, and the third prediction sample may be derived based on the third DIMD mode.

In addition, for example, the first blend prediction sample may be derived based on performing a weighted average of the first prediction sample, the second prediction sample, and the third prediction sample. In this case, the sum of the weight of the first prediction sample and the weight of the second prediction sample may be ⅔ and the weight of the third prediction sample may be ⅓.

In addition, for example, the second blend prediction sample may be derived based on performing a weighted average of the first prediction sample and the second prediction sample. In this case, a sum of the weights of the first prediction sample and the weights of the second prediction sample may be 1.

In addition, for example, the third blend prediction sample may be derived based on performing a weighted average of the first prediction sample and the third prediction sample. In this case, the weight of the first prediction sample may be ⅔ and the weight of the third prediction sample may be ⅓.

The fourth blend prediction sample may be derived based on performing a weighted average of the second prediction sample and the third prediction sample. In this case, the weight of the second prediction sample may be ⅔ and the weight of the third prediction sample may be ⅓.

In addition, for example, the third DIMD mode may be a planar mode. Alternatively, for example, the third DIMD mode may be a DC mode.

In addition, for example, the DIMD-related information may include DIMD index information. In this case, the DIMD index information may be related to the blend prediction samples derived from the DIMD modes. Specifically, the DIMD index information may indicate one of the blend prediction samples.

The decoding apparatus may receive information on the residual of the current block when residual samples of the current block are present. The information on the residual may include transform coefficients on residual samples. The decoding apparatus may derive residual samples (or residual sample array) for the current block based on the residual information. Specifically, the decoding apparatus may derive quantized transform coefficients based on residual information. Quantized transform coefficients may have a one-dimensional vector form based on a coefficient scanning order. The decoding apparatus may derive transform coefficients based on a dequantization process for the quantized transform coefficients. The decoding apparatus may derive residual samples based on transform coefficients.

The decoding apparatus may generate reconstructed samples based on (intra) prediction samples and residual samples, and may derive a reconstructed block or a reconstructed picture based on the reconstructed samples. Specifically, the decoding apparatus may generate reconstructed samples based on the sum of (intra) prediction samples and residual samples. As described above, the decoding apparatus may then apply an in-loop filtering process such as deblocking filtering and/or SAO process to the reconstructed picture in order to improve subjective/objective picture quality, if necessary.

For example, the decoding apparatus may decode a bitstream or encoded information to obtain image information including all or some of the above information (or syntax elements). In addition, the bitstream or encoded information may be stored in a computer-readable storage medium, and may cause the above-described decoding method to be performed.

In the above-described embodiment, the methods are described based on the flowchart having a series of steps or blocks. The disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the embodiments of this document may be implemented in the form of software, and the encoding apparatus and/or decoding apparatus according to this document may be included in, for example, a TV, computer, smartphone, set-top box, display device, etc. that that performs the processing.

When the embodiments in this document are implemented as software, the above-described method may be implemented as a module (process, function, etc.) that performs the above-described functions. A module can be stored in memory and executed by a processor. The memory may be internal or external to the processor, and may be coupled with the processor in a variety of well-known means A processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in this document may be implemented and performed on a processor, microprocessor, controller, or chip. For example, functional units shown in each drawing may be implemented and performed on a computer, processor, microprocessor, controller, or chip. In this case, information for implementation (eg, information on instructions) or an algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle(including autonomous vehicles) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 21:
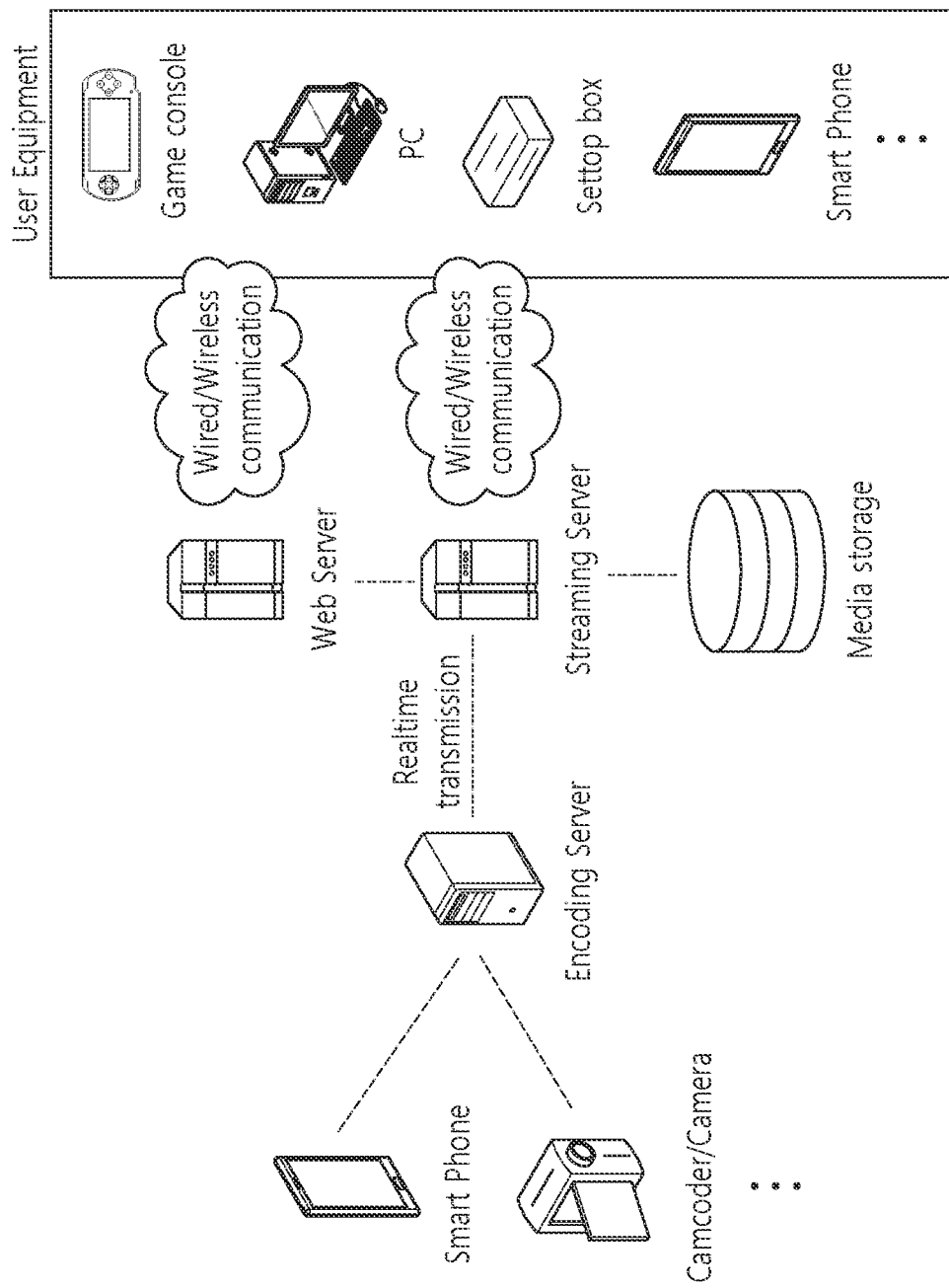
FIG. 21 illustrates a structural diagram of a contents streaming system to which the present disclosure may be applied.

FIG. 21 illustrates a structural diagram of a contents streaming system to which the present disclosure may be applied.

Referring to FIG. 21, a content streaming system to which embodiments of this document are applied may largely include an encoding server, a streaming server, a web server, a media storage, a user apparatus, and a multimedia input apparatus.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the image decoding method comprising:
   obtaining image information including DIMD (Decoder side Intra Mode Derivation) related information from a bitstream;
   determining whether a DIMD is applied to a current block based on the DIMD related information;
   deriving the DIMD modes for the current block based on the DIMD being applied to the current block; and
   generating a prediction sample of the current block based on the DIMD modes.

2. The method of claim 1, wherein the DIMD modes are derived based on neighboring reference samples of the current block.

3. The method of claim 2, wherein the prediction sample is generated based on performing a weighted average based on a first prediction sample and a second prediction sample,
   wherein the DIMD modes include a first DIMD mode and a second DIMD mode,
   wherein the first prediction sample is derived based on the first DIMD mode, and
   wherein the second prediction sample is derived based on the second DIMD mode.

4. The method of claim 3, wherein the DIMD modes are derived based on intensity derived using a sobel filter based on the neighboring reference samples of the current block,
   wherein the first DIMD mode is related to the highest intensity, and
   wherein the second DIMD mode is related to the second highest intensity.

5. The method of claim 2, wherein the prediction sample is generated based on performing a weighted average based on at least two of a first prediction sample, a second prediction sample, or a third prediction sample, wherein the DIMD modes include at least one of a first DIMD mode, a second DIMD mode or a third DIMD mode, wherein the first prediction sample is derived based on the first DIMD mode, wherein the second prediction sample is derived based on the second DIMD mode, and wherein the third prediction sample is derived based on the third DIMD mode.

6. The method of claim 5, wherein the DIMD modes are derived based on intensity derived using a sobel filter based on the neighboring reference samples of the current block, wherein the first DIMD mode is related to the highest intensity, and wherein the second DIMD mode is related to the second highest intensity.

7. The method of claim 5, wherein a weight for the first prediction sample, a weight for the second prediction sample and a weight for the third prediction sample are the same, and wherein a sum of the weight for the first prediction sample, the weight for the second prediction sample and the weight for the third prediction sample is 1.

8. The method of claim 5, wherein a weight for the second prediction sample is the same as a weight for the third prediction sample, and wherein a weight for the first prediction sample is greater than the weight for the second prediction sample, wherein a sum of the weight for the first prediction sample, the weight for the second prediction sample and the weight for the third prediction sample is 1.

9. The method of claim 2, wherein the DIMD modes include at least one of a first DIMD mode, a second DIMD mode or a third DIMD mode, wherein the prediction sample is generated based on one of blend prediction samples, wherein the blend prediction samples include a first blend prediction sample, a second blend prediction sample, a third blend prediction sample and a fourth blend prediction sample, wherein the first blend prediction sample is derived based on performing a weighted average based on at least two of a first prediction sample, a second prediction sample, or a third prediction sample of the current block, wherein the second blend prediction sample is derived based on performing a weighted average based on at least two of the first prediction sample, the second prediction sample, or the third prediction sample of the current block, wherein the third blend prediction sample is derived based on performing a weighted average based on at least two of the first prediction sample, the second prediction sample, or the third prediction sample of the current block, wherein the fourth blend prediction sample is derived based on performing a weighted average based on at least two of the first prediction sample, the second prediction sample, or the third prediction sample of the current block, wherein the first prediction sample is derived based on the first DIMD mode wherein the second prediction sample is derived based on the second DIMD mode, and wherein the third prediction sample is derived based on the third DIMD mode.

10. The method of claim 9, wherein the first blend prediction sample is derived based on performing a weighted average of the first prediction sample, the second prediction sample and the third prediction sample, wherein a sum of a weight for the first prediction sample and a weight for the second prediction sample is ⅔ and a weight for the third prediction sample is ⅓, wherein the second blend prediction sample is derived based on performing a weighted average of the first prediction sample and the second prediction, wherein a sum of the weight for first prediction sample and the weight for the second prediction sample is 1, wherein the third blend prediction sample is derived based on performing a weighted average of the first prediction sample and the third prediction sample, wherein the weight for the first prediction sample is ⅔ and the weight for the third prediction sample is ⅓, wherein the fourth blend prediction sample is derived based on performing a weighted average of the second prediction sample and the third prediction sample, wherein the weight for the second prediction sample is ⅔ and the weight for the third prediction sample is ⅓, wherein the third DIMD mode is a planar mode, wherein the DIMD related information includes DIMD index information, and wherein the DIMD index information is related to the blend prediction samples which are derived in relation to the DIMD modes.

11. An image encoding method performed by an encoding apparatus, the image encoding method comprising:

determining whether a DIMD (Decoder side Intra Mode Derivation) mode is applied to a current block;

generating DIMD related information related to whether the DIMD is applied to the current block;

deriving DIMD modes for the current block based on the DIMD being applied to the current block;

generating a prediction sample of the current block based on the DIMD modes; and encoding image information including the DIMD related information.

12. The method of claim 11, wherein the DIMD modes are derived based on neighboring reference samples of the current block.

13. The method of claim 12, wherein the prediction sample is generated based on performing a weighted average based on a first prediction sample and a second prediction sample, wherein the DIMD modes include a first DIMD mode and a second DIMD mode, wherein the first prediction sample is derived based on the first DIMD mode, wherein the second prediction sample is derived based on the second DIMD mode, wherein the DIMD modes are derived based on intensity derived using a sobel filter based on the neighboring reference samples of the current block, wherein the first DIMD mode is related to the highest intensity, and wherein the second DIMD mode is related to the second highest intensity.

14. The method of claim 12, wherein the prediction sample is generated based on performing a weighted average based on at least two of a first prediction sample, a second prediction sample, or a third prediction sample, wherein the DIMD modes include at least one of a first DIMD mode, a second DIMD mode or a third DIMD mode, wherein the first prediction sample is derived based on the first DIMD mode, wherein the second prediction sample is derived based on the second DIMD mode, and wherein the third prediction sample is derived based on the third DIMD mode.

15. The method of claim 14, wherein the DIMD modes are derived based on intensity derived using a sobel filter based on the neighboring reference samples of the current block, wherein the first DIMD mode is related to the highest intensity, and wherein the second DIMD mode is related to the second highest intensity.

16. The method of claim 14, wherein a weight for the first prediction sample, a weight for the second prediction sample and a weight for the third prediction sample are the same, and wherein a sum of the weight for the first prediction sample, the weight for the second prediction sample and the weight for the third prediction sample is 1.

17. The method of claim 14, wherein a weight for the second prediction sample is the same as a weight for the third prediction sample, and wherein a weight for the first prediction sample is greater than the weight for the second prediction sample, wherein a sum of the weight for the first prediction sample, the weight for the second prediction sample and the weight for the third prediction sample is 1.

18. The method of claim 12, wherein the DIMD modes include at least one of a first DIMD mode, a second DIMD mode or a third DIMD mode, wherein the prediction sample is generated based on one of blend prediction samples, wherein the blend prediction samples include a first blend prediction sample, a second blend prediction sample, a third blend prediction sample and a fourth blend prediction sample, wherein the first blend prediction sample is derived based on performing a weighted average based on at least two of a first prediction sample, a second prediction sample, or a third prediction sample of the current block, wherein the second blend prediction sample is derived based on performing a weighted average based on at least two of the first prediction sample, the second prediction sample, or the third prediction sample of the current block, wherein the third blend prediction sample is derived based on performing a weighted average based on at least two of the first prediction sample, the second prediction sample, or the third prediction sample of the current block, wherein the fourth blend prediction sample is derived based on performing a weighted average based on at least two of the first prediction sample, the second prediction sample, or the third prediction sample of the current block, wherein the first prediction sample is derived based on the first DIMD mode wherein the second prediction sample is derived based on the second DIMD mode, and wherein the third prediction sample is derived based on the third DIMD mode.

19. The method of claim 18, wherein the first blend prediction sample is derived based on performing a weighted average of the first prediction sample, the second prediction sample and the third prediction sample, wherein a sum of a weight for the first prediction sample and a weight for the second prediction sample is ⅔ and a weight for the third prediction sample is ⅓, wherein the second blend prediction sample is derived based on performing a weighted average of the first prediction sample and the second prediction, wherein a sum of the weight for first prediction sample and the weight for the second prediction sample is 1, wherein the third blend prediction sample is derived based on performing a weighted average of the first prediction sample and the third prediction sample, wherein the weight for the first prediction sample is ⅔ and the weight for the third prediction sample is ⅓, wherein the fourth blend prediction sample is derived based on performing a weighted average of the second prediction sample and the third prediction sample, wherein the weight for the second prediction sample is ⅔ and the weight for the third prediction sample is ⅓, wherein the third DIMD mode is a planar mode, wherein the DIMD related information includes DIMD index information, and wherein the DIMD index information is related to the blend prediction samples which are derived in relation to the DIMD modes.

20. A computer-readable storage medium storing a bitstream generated by a method, the method comprising:

determining whether a DIMD (Decoder side Intra Mode Derivation) mode is applied to a current block;

generating DIMD related information related to whether the DIMD is applied to the current block;

deriving DIMD modes for the current block based on the DIMD being applied to the current block;

generating a prediction sample of the current block based on the DIMD modes; and encoding image information including the DIMD related information.

* * * * *